(12) United States Patent
Yotsukura

(10) Patent No.: US 8,082,269 B2
(45) Date of Patent: Dec. 20, 2011

(54) ACCOUNT ITEM MANAGEMENT SYSTEM

(75) Inventor: Mikio Yotsukura, Tokyo (JP)

(73) Assignee: Class Technology Co., Ltd., Tokyo (JP)

( * ) Notice: Subject to any disclaimer, the term of this patent is extended or adjusted under 35 U.S.C. 154(b) by 873 days.

(21) Appl. No.: 11/921,768

(22) PCT Filed: May 23, 2006

(86) PCT No.: PCT/JP2006/310202
§ 371 (c)(1),
(2), (4) Date: Dec. 7, 2007

(87) PCT Pub. No.: WO2006/132079
PCT Pub. Date: Dec. 14, 2006

(65) Prior Publication Data
US 2009/0234885 A1    Sep. 17, 2009

(30) Foreign Application Priority Data

Jun. 9, 2005  (JP) ................................ 2005-169693
Oct. 27, 2005 (JP) ................................ 2005-312392

(51) Int. Cl.
*G06F 17/00* (2006.01)
(52) U.S. Cl. ............. 707/778; 707/769; 707/755; 726/6
(58) Field of Classification Search ...... 726/6; 707/778, 707/769, 741, 755
See application file for complete search history.

(56) References Cited

U.S. PATENT DOCUMENTS

2003/0050876 A1 * 3/2003 Tawara et al. .................. 705/30

FOREIGN PATENT DOCUMENTS

| JP | 09-034938 | 2/1997 |
| JP | 11-195057 | 7/1999 |
| JP | 11-296586 | 10/1999 |
| JP | 2004-118524 | 4/2004 |
| JP | 2005-99904 | 4/2005 |

* cited by examiner

*Primary Examiner* — Belix M Ortiz
(74) *Attorney, Agent, or Firm* — Clark & Brody

(57) ABSTRACT

An account item management system is provided, wherein account item elements are classified into first to n'th groups in order from highest to lowest levels, such that the first group encompasses the highest-level concepts, and the n'th group encompasses the lowest-level concepts, and the account item elements classified into the first to n'th groups are memorized in the system 10 chronologically from the past to the present. The system 10 is capable of constructing a hierarchically-structured accounting database based on the account item elements, such that the account item elements are systematically related to one another, and the system comprises: database generation means for generating, in real time, the hierarchically-structured accounting database as of any given point in the past or at the present; and database output means for outputting the generated hierarchically-structured accounting database in real time.

4 Claims, 23 Drawing Sheets

APRIL 1, XX

[FIRST GROUP]
(START DATE:APRIL 1)
> OPERATING PROFIT AND LOSS

[SECOND GROUP]
(START DATE:APRIL 1)
> SALES OF COMPANY A (¥1,000,000)

(START DATE:APRIL 1)
> COST OF SALES BY COMPANY A (¥220,000)

(START DATE:APRIL 1)
> SELLING AND GENERAL ADMINISTRATIVE EXPENSES OF COMPANY A (¥450,000)

(START DATE:APRIL 1)
> OPERATING REVENUE (¥330,000)

FIG. 4

MAY 15, XX

[FIRST GROUP]　　　　　　　　　　　　　[SECOND GROUP]

(START DATE:APRIL 1)

| OPERATING PROFIT AND LOSS |

(START DATE:APRIL 1)
　　　　　　　　　　　　　| SALES OF COMPANY A (¥1,000,000) |
　　　　　　　　　　　　　(START DATE:MAY 15)
　　　　　　　　　　　　　| SALES OF COMPANY B (¥800,000) |
　　　　　　　　　　　　　(START DATE:APRIL 1)
　　　　　　　　　　　　　| COST OF SALES BY COMPANY A (¥220,000) |
　　　　　　　　　　　　　(START DATE:MAY 15)
　　　　　　　　　　　　　| COST OF SALES BY COMPANY B (¥350,000) |
　　　　　　　　　　　　　(START DATE:APRIL 1)
　　　　　　　　　　　　　| SELLING AND GENERAL ADMINISTRATIVE EXPENSES OF COMPANY A (¥450,000) |
　　　　　　　　　　　　　(START DATE:MAY 15)
　　　　　　　　　　　　　| SELLING AND GENERAL ADMINISTRATIVE EXPENSES OF COMPANY B (¥370,000) |
　　　　　　　　　　　　　(START DATE:APRIL 1)
　　　　　　　　　　　　　| OPERATING REVENUE (¥410,000) |

FIG. 6

JUNE 20, XX

[FIRST GROUP]  [SECOND GROUP]

(START DATE:APRIL 1)

| OPERATING PROFIT AND LOSS |

(START DATE:APRIL 1)
| SALES OF COMPANY A (¥950,000) |

(START DATE:MAY 15)
| SALES OF COMPANY B (¥800,000) |

(START DATE:JUNE 20)
| SALES OF COMPANY C (¥1,050,000) |

(START DATE:APRIL 1)
| COST OF SALES BY COMPANY A (¥210,000) |

(START DATE:MAY 15)
| COST OF SALES BY COMPANY B (¥350,000) |

(START DATE:JUNE 20)
| COST OF SALES BY COMPANY C (¥410,000) |

(START DATE:APRIL 1)
| SELLING AND GENERAL ADMINISTRATIVE EXPENSES OF COMPANY A (¥450,000) |

(START DATE:MAY 15)
| SELLING AND GENERAL ADMINISTRATIVE EXPENSES OF COMPANY B (¥370,000) |

(START DATE:JUNE 20)
| SELLING AND GENERAL ADMINISTRATIVE EXPENSES OF COMPANY C (¥480,000) |

(START DATE:APRIL 1)
| OPERATING REVENUE (¥530,000) |

FIG. 12

MAY 15, XX

[FIRST GROUP]                              [SECOND GROUP]

(START DATE:APRIL 1)

| OPERATING PROFIT AND LOSS |

(START DATE:APRIL 1)

| SALES OF COMPANY A (¥1,000,000) |

(START DATE:MAY 15)

| SALES OF COMPANY D (¥750,000) |

(START DATE:APRIL 1)

| COST OF SALES BY COMPANY A (¥220,000) |

(START DATE:MAY 15)

| COST OF SALES BY COMPANY D (¥190,000) |

(START DATE:APRIL 1)

| SELLING AND GENERAL ADMINISTRATIVE EXPENSES OF COMPANY A (¥450,000) |

(START DATE:MAY 15)

| SELLING AND GENERAL ADMINISTRATIVE EXPENSES OF COMPANY D (¥310,000) |

(START DATE:APRIL 1)

| OPERATING REVENUE (¥580,000) |

FIG. 17

AUGUST 10, XX

[FIRST GROUP]　　　　　　　　　　　　　　[SECOND GROUP]

(START DATE:JULY 1)

| OPERATING PROFIT AND LOSS |

(START DATE:JULY 1)
| SALES OF COMPANY A (¥1,20,000) |

(START DATE:AUGUST 10)
| SALES OF COMPANY B (¥950,000) |

(START DATE:JULY 1)
| COST OF SALES BY COMPANY A (¥220,000) |

(START DATE:AUGUST 10)
| COST OF SALES BY COMPANY B (¥360,000) |

(START DATE:JULY 1)
| SELLING AND GENERAL ADMINISTRATIVE EXPENSES OF COMPANY A (¥470,000) |

(START DATE:AUGUST 10)
| SELLING AND GENERAL ADMINISTRATIVE EXPENSES OF COMPANY B (¥340,000) |

(START DATE:JULY 1)
| OPERATING REVENUE (¥760,000) |

AUGUST 15, XX
[FIRST GROUP]
(START DATE: APRIL 1)

[SECOND GROUP]

OPERATING PROFIT AND LOSS (START DATE: APRIL 1)
— SALES OF COMPANY A (¥9,504,000)
(START DATE: JULY 1)
— SALES OF COMPANY A (¥12,004,000)
(START DATE: MAY 15)
— SALES OF COMPANY B (¥800,000)
(START DATE: AUGUST 10)
— SALES OF COMPANY B (¥950,000)
(START DATE: JUNE 20)
— SALES OF COMPANY C (¥1,050,000)
(START DATE: APRIL 1)
— TOTAL COST OF SALES BY COMPANY A (¥210,000)
(START DATE: JULY 1)
— TOTAL COST OF SALES BY COMPANY A (¥220,000)
(START DATE: MAY 15)
— TOTAL COST OF SALES BY COMPANY B (¥350,000)
(START DATE: AUGUST 10)
— TOTAL COST OF SALES BY COMPANY B (¥360,000)
(START DATE: JUNE 20)
— TOTAL COST OF SALES BY COMPANY C (¥410,000)
(START DATE: APRIL 1)
— SELLING AND GENERAL ADMINISTRATIVE EXPENSES OF COMPANY A (¥450,000)
(START DATE: JULY 1)
— SELLING AND GENERAL ADMINISTRATIVE EXPENSES OF COMPANY A (¥470,000)
(START DATE: MAY 15)
— SELLING AND GENERAL ADMINISTRATIVE EXPENSES OF COMPANY B (¥37,000)
(START DATE: AUGUST 10)
— SELLING AND GENERAL ADMINISTRATIVE EXPENSES OF COMPANY B (¥340,000)
(START DATE: JUNE 20)
— SELLING AND GENERAL ADMINISTRATIVE EXPENSES OF COMPANY C (¥480,000)
(START DATE: APRIL 1)
— OPERATING REVENUE (¥1,290,000)

FIG. 19

ACCOUNT ITEM MANAGEMENT SYSTEM

TECHNICAL FIELD

The present invention relates to an account item management system in which a computer resource is used to manage a plurality of account item elements that are used as accounting data and arranged from the highest to the lowest-level concepts.

BACKGROUND ART

There is a system for preparing ledger sheets according to management accounting, as well as financial statements according to financial accounting (see Patent Document 1). In this system, account item attributes are acquired from a financial accounting system, independently of an account item system according to financial accounting, and rearrangement means and adjustment means are memorized in a memory device, such that financial statements aggregated by the financial accounting system are rearranged and adjusted via the rearrangement means and the adjustment means. The system is capable of preparing the financial statements according to financial accounting in conjunction with the financial accounting system, and further capable of preparing the ledger sheets according to management accounting by rearranging and adjusting the financial statements.
Patent Document 1: Japanese Laid-Open Patent Publication No. 2005-99904

DISCLOSURE OF THE INVENTION

Problem to be Solved by the Invention

The system disclosed in the above publication can prepare financial statements for each period by aggregating entered account item elements. However, this system does not manage the individual account item elements chronologically from the past to the present, and therefore cannot generate and output, in real time, a hierarchically-structured accounting database as of any given point in time based on the account item elements memorized from the past up to the present, in such a manner that the account item elements are systematically related to one another.

An objective of the present invention is to provide an account item management system capable of generating and outputting, in real time, a hierarchically-structured accounting database as of any given point in the past or at the present based on account item elements.

Means for Solving the Problem

The basis of the present invention for solving the above problem is an account item management system for managing a plurality of account item elements using a computer resource, the account item elements being used as accounting data and arranged from highest to lowest-level concepts.

The invention on the above basis has the following features. In the account item management system, the account item elements are classified into first to n'th groups in order from highest to lowest levels, such that the first group encompasses the highest-level concepts, and the n'th group encompasses the lowest-level concepts, and the account item elements classified into the first to n'th groups are memorized in the system chronologically from past to present. The account item management system is capable of constructing a hierarchically-structured accounting database based on the account item elements, such that the account item elements are systematically related to one another, and the system comprises: database generation means for generating, in real time, the hierarchically-structured accounting database as of any given point in the past or at the present; and database output means for outputting the generated hierarchically-structured accounting database in real time. Here, the hierarchically-structured accounting database comprehends accounting databases for a hierarchically-structured profit and loss statement, a hierarchically-structured balance sheet, a hierarchically-structured budget statement of income and expenditure, a hierarchically-structured surplus statement, a hierarchically-structured surplus appropriation statement, hierarchically-structured supporting schedules for financial statements, a hierarchically-structured appropriation statement, a hierarchically-structured statement of loss disposition, a hierarchically-structured cash flow statement, hierarchically-structured consolidated financial statements, a hierarchically-structured general ledger, etc.

In an exemplary embodiment of the invention, the database generation means is capable of generating, in real time, the hierarchically-structured accounting database with at least one classification from among the first to n'th groups, and the database output means is capable of outputting, in real time, the hierarchically-structured accounting database generated with at least one classification from among the first to n'th groups.

In another exemplary embodiment of the invention, when a given period in the past or up to the present is designated, the database generation means is capable of generating, in real time, a hierarchically-structured accounting database based on account item elements present in the designated period, and the database output means is capable of outputting, in real time, the hierarchically-structured accounting database based on the account item elements present in the designated period.

In another exemplary embodiment of the invention, the account item management system is such that a start indicator is set per account item element to indicate a point of integration into a hierarchically-structured accounting database, and an end indicator is set per account item element to indicate a point of exclusion from the hierarchically-structured accounting database, so that the start indicator and the end indicator are used to manage hierarchically-structured accounting databases and account item elements chronologically from the past to the present.

In another exemplary embodiment of the invention, the account item management system comprises item modification means for modifying the account item elements currently or retroactively, and in this system, when an account item element is retroactively modified by the item modification means, account item elements that have been present since the modification of the account item element up to the present and are to be modified to accord with the modified account item element are automatically modified.

In another exemplary embodiment of the invention, the account item management system comprises item modification means for modifying the account item elements currently or retroactively, and in this system, when an account item element that belongs to a high-level concept is modified currently or retroactively by the item modification means, other account item elements within lower-level concepts that have been present since the modification of the account item element up to the present and are to be modified to accord with the modified account item element are automatically erased.

In another exemplary embodiment of the invention, the modification of the account item element is addition to, changing, or deletion of the account item element.

Effect of the Invention

The account item management system according to the present invention is capable of constructing a plurality of hierarchically-structured accounting databases as of different points, either in the past or both in the past and present, based on account item elements chronologically memorized in the system with the classifications from the first group (account item group for the highest-level concepts) to the n'th group (account item group for the lowest-level concepts), the database generation means is capable of generating, in real time, a hierarchically-structured accounting database as of any given point in the past or at the present, and the database output means is capable of outputting, in real time, the generated hierarchically-structured accounting database as of the given point. The system generates and outputs hierarchically-structured accounting databases as of any given points, either in the past or both in the past and present, thereby making it possible to weigh, as necessary, hierarchically-structured accounting databases and account item elements as of different points in time. The system makes it possible to clarify systematic connections between the account item elements based on the generated hierarchically-structured accounting databases, and thereby to carry out suitable accounting analysis based on the hierarchically-structured accounting databases and the account item elements.

With the database generation means capable of generating, in real time, the hierarchically-structured accounting database with at least one of the classifications from the first to n'th groups, and the database output means capable of outputting, in real time, the hierarchically-structured accounting database generated with at least one of the classifications from the first to n'th groups, the system is capable of generating and outputting an individual hierarchically-structured accounting database with any necessary group(s) from among the first to n'th groups. This system makes it possible to clarify, for each group, relative connections between the account item elements based on the hierarchically-structured accounting database, and thereby to carry out suitable and reliable accounting analysis based on the hierarchically-structured accounting database and the account item elements.

When a given period in the past or up to the present is designated, the system is capable of generating and outputting, in real time, a hierarchically-structured accounting database based on account item elements present in the designated period, and by designating a given period, a hierarchically-structured accounting database can be generated and outputted at any time, such that account item elements present in the designated period are systematically related. This system makes it possible to freely designate a period in the past or up to the present, and carry out accounting analysis for the designated period based on a hierarchically-structured accounting database using account item elements present in the designated period.

With the start indicator and the end indicator being set per account item element to respectively indicate points of integration into and exclusion from a hierarchically-structured accounting database, the system clarifies the points at which the account item element has been integrated into and excluded from the hierarchically-structured accounting database, so that a period during which a given account item element has been contained in the hierarchically-structured accounting database can be identified, making it possible to reliably manage hierarchically-structured accounting databases and account item elements chronologically from the past to the present using the start indicator and the end indicator.

The system includes the item modification means for modifying the account item elements currently or retroactively, such that, when an account item element is retroactively modified, account item elements that have been present since the modification of the account item element up to the present and are to be modified to accord with the modified account item element are automatically modified, and the system is capable of freely modifying the account item elements as of any point in the past or at the present, and constructing a hierarchically-structured accounting database as of any point in the past or at the present based on the modified account item elements. In this system, when a given account item element is retroactively modified, it is not necessary to individually modify all account item elements that have been present since the modification of the account item element up to the present and are associated with the account item element, and therefore it is possible to prevent an error from occurring due to individual modification of all the account item elements, as well as to prevent the procedure from becoming complicated.

The system includes the item modification means for modifying the account item elements currently or retroactively, such that, when an account item element that belongs to a high-level concept is modified currently or retroactively, other account item elements within lower-level concepts that have been present since the modification of the account item element up to the present and are to be modified to accord with the modified account item element are automatically erased, and the system is capable of freely modifying account item elements as of any given point in the past or at the present, and constructing a hierarchically-structured accounting database as of any given point in the past or at the present based on the modified account item elements. The account item elements within the lower-level concepts that are to be modified with the modified account item element that belongs to the high-level concept do not remain in the system, and the account item elements within the lower level concepts that are to be modified to accord with the modification of the account item element within the high-level concept are not contained in the hierarchically-structured accounting database, so that it is possible to prevent an erroneous hierarchically-structured accounting database from being generated during a period from the modification of the account item element up to the present.

In the system where the modification of the account item element is addition to, changing, or deletion of the account item element, even if any account item element that is to be memorized in the system is missing, it is possible to freely add that missing account item element; even if any account item element present at a point in the past is erroneous, it can be changed to a correct account item element; and furthermore, even if any unnecessary account item element is memorized in the system, it is possible to retroactively delete that unnecessary account item element from the system.

BRIEF DESCRIPTION OF THE DRAWINGS

FIG. 4 is a diagram of a hierarchically-structured accounting database as of May 15, xx.

FIG. 6 is a diagram of a hierarchically-structured accounting database as of June 20, xx.

FIG. 12 is a diagram of the hierarchically-structured accounting database as of May 15, xx where account item elements are modified.

FIG. 17 is a diagram of a hierarchically-structured accounting database as of August 10, xx.

FIG. 19 is a diagram of a hierarchically-structured accounting database as of August 15, xx.

DESCRIPTION OF REFERENCE CHARACTERS

Figure 1:
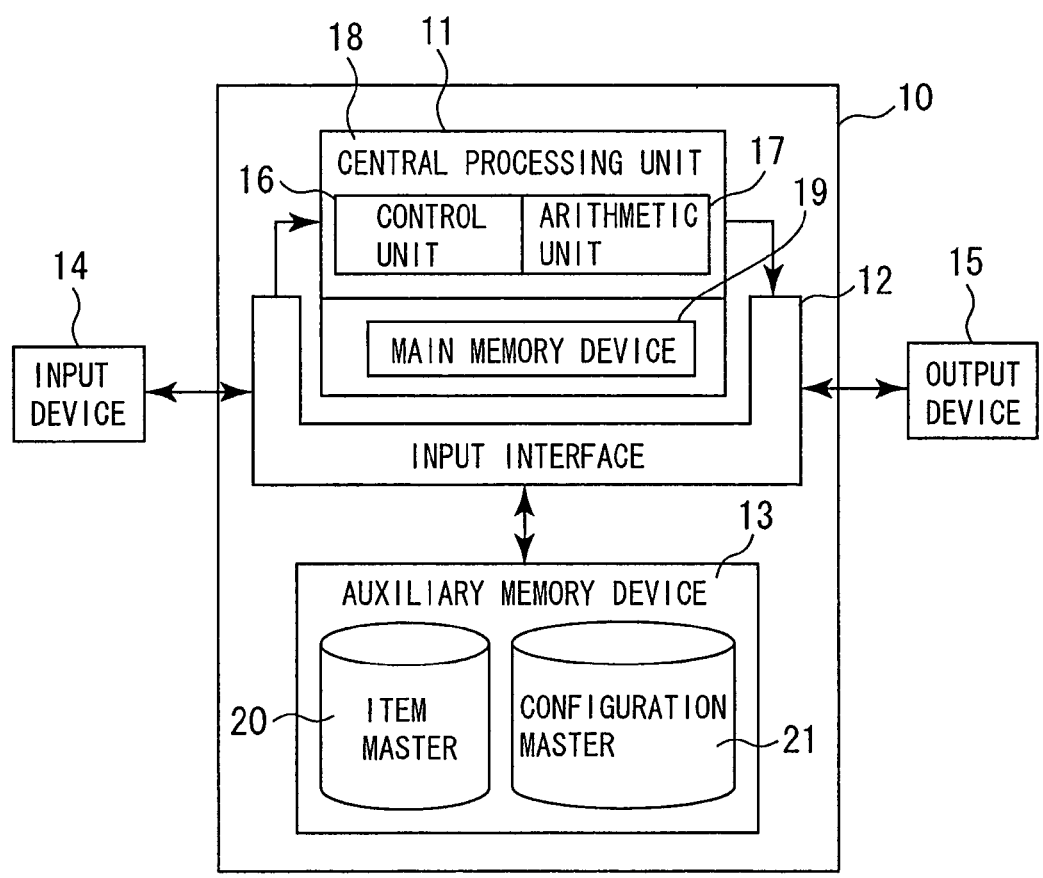
FIG. 1 is a configuration diagram of an exemplary account item management system.

10 account item management system
11 personal computer (computer resource)
12 input/output interface
13 auxiliary memory device
14 input device
15 output device
16 control unit
17 arithmetic unit
18 central processing unit
19 main memory device
24 item master
25 configuration master

BEST MODE FOR CARRYING OUT THE INVENTION

Referring to the accompanying drawings, an account item management system according to the present invention will be described in detail below.

FIG. 1 is a configuration diagram of an exemplary account item management system 10. In the system 10, a personal computer 11 (a computer resource) is used to manage account item elements that are used as accounting data and arranged from first to n'th group, and a hierarchically-structured accounting database to be described below is prepared based on the account item elements. Here, account item elements that belong to the first group are those within the highest-level concepts, account item elements that belong to the n'th group are those within the lowest-level concepts, and account item elements within intermediate-range concepts belong to any of the second to (n−1)'th groups between the first group and the n'th group.

The system 10 is composed of the computer 11, and an auxiliary memory device 13 connected to the computer 11 via an input/output interface 12. The computer 11 is connected to an input device 14 and an output device 15 via the input/output interface 12. The computer 11 is formed of a central processing unit (CPU) 18, which includes a control unit 16 and an arithmetic unit 17, and a main memory device 19 having a predetermined application program stored therein. In the system 10, a predetermined operating system is activated from the application program to execute various means, such as database generation means, database output means, and item modification means, in accordance with the operating system. The auxiliary memory device 13 includes an item master 20 for memorizing the account item elements individually, and a configuration master 21 for memorizing systematic consolidated relationships between the account item elements. The item master 20 manages information concerning the individual account item elements. The configuration master 21 manages information concerning consolidations between the account item elements. The consolidated relationships indicate conceptual connections between the account item elements in terms of either higher or lower. A keyboard, a ten-key unit, a scanner, or the like, is used as the input device 14. A liquid crystal display, a CRT, a printer, or the like, is used as the output device 15. The main memory device 19 has pre-memorized therein a plurality of existing account items for individually specifying the account item elements. Examples of the existing account items are shown below.

1. Examples of the existing account items for forming a balance sheet: (1) first group: assets, liabilities, and equity; (2-1) concepts at the level immediately below assets (second group): current assets, fixed assets, and deferred assets; (2-2) concepts at the level immediately below liabilities (second group): current liabilities, and fixed liabilities; (2-3) concepts at the level immediately below equity (second group): capital, capital surplus, earned surplus, unrealized gains on available-for-sale securities, and treasury stocks; (3-1) concepts at the level immediately below current assets (third group): cash and deposits, bills receivable, accounts receivable, marketable securities, products and goods, work-in-process goods and semi finished goods, materials, advances, advance payments and prepaid expenses, deferred tax assets, other current assets, and allowances for doubtful accounts; (3-2) concepts at the level immediately below fixed assets (third group): tangible fixed assets, intangible fixed assets, and investments; (3-3) concepts at the level immediately below deferred assets (third group): founding expenses, opening expenses, new stock issuance cost, bond issuance cost, development expenses, and experiment and research expenses; (3-4) concepts at the level immediately below current liabilities (third group): bills payable, accounts payable, accrued accounts and expenses, accrued corporate tax, accrued consumption tax, deposits received, allowances for sales return, allowances for sales rebate, and other current liabilities; (3-5) concepts at the level immediately below fixed liabilities (third group): allowances for employees' retirement benefits, allowances for directors' retirement benefits, long-term deferred tax liabilities brought forward, and other fixed liabilities; (3-5) concepts at the level immediately below capital surplus (third group): capital surplus reserve; (3-6) concepts at the level immediately below earned surplus (third group): earned surplus reserve, reserve for retirement allowances, reserve for dividends, reserve for research and development, reserve for facility replacement, reserve for special depreciation, other reserves, and inappropriate retained earnings for the period; (4-1) concepts at the level immediately below tangible fixed assets (fourth group): buildings and structures, machinery, vehicles and delivery equipment, tools, furniture and fixtures, land, and construction in progress; (4-2) concepts at the level immediately below investments (fourth group): investments in securities, subsidiary stocks, long-term deposits, long-term loans receivable, long-term prepaid expenses, and allowances for doubtful accounts.

2. Examples of the existing account items for forming a profit and loss statement: (1) first group: operating profit and loss, nonoperating profit and loss, extraordinary profit and loss, and inappropriate retained earnings; (2-1) concepts at the level immediately below operating profit and loss (second group): sales, cost of sales, selling and general administrative expenses, and operating revenue; (2-2) concepts at the level immediately below nonoperating profit and loss (second group): nonoperating income, and nonoperating expenses; (2-3) concepts at the level immediately below extraordinary profit and loss (second group): extraordinary income, and extraordinary losses; (3-1) concepts at the level immediately below cost of sales (third group): opening inventory, cost of goods purchased for the period, and closing inventory; (3-2) concepts at the level immediately below nonoperating income (third group): interest received, dividends, interest on marketable securities, rental income on invested real estates, and other nonoperating income; (3-3) concepts at the level immediately below nonoperating expenses (third group): interest paid, bond interest, amortization of bond issuance discount, amortization of bond issuance cost, and other nonoperating expenses; (3-4) concepts at the level immediately below extraordinary income (third group): gains from prior period adjustments, and gains on sales of fixed assets; (3-5) concepts at the level immediately below extraordinary losses (third group): losses from prior period adjustments, and losses on sales of fixed assets.

3. Examples of the existing account items for forming a budget statement of income and expenditure: (1) first group: income, and expenditures; (2-1) concepts at the level immediately below income (second group): income from membership fees, income from operating assets, business income, income from consignment fees, total income for the period, balance carried over from the previous period, total income, etc.; (2-2) concepts at the level immediately below expenditures (second group): business expenses, management expenses, expenditures on acquisition of fixed assets, expenditures brought forward, total expenditures for the period, balance of income and expenditures for the period, and balance of income and expenditures carried forward to the next period; (3-1) concepts at the level immediately below income from membership fees (third group): income from membership fees, income from registration fees, and income from admission fees; (3-2) concepts at the level immediately below income from operating assets (third group): income from deposit interest, and income from conference room rental fees; (3-3) concepts at the level immediately below business income (third group): income from advertisement fees, income from publications, and miscellaneous income; (3-4) concepts at the level immediately below income from consignment fees (third group): income from office work consignment fees, and income from personnel cost contribution; (3-5) concepts at the level immediately below business expenses (third group): publication issuance cost, welfare work expenses, public relations expenses, liaison expenses, and other business expenses; (3-6) concepts at the level immediately below management expenses (third group): salary benefits, allowances for temporary employees, commutation allowances, legal welfare expenses, rental fees, contracted management fees, utility charges, subcontracting cost, printing cost, communications expenses, repairs expenses, supplies expenses, taxes and public charges, and commissions paid; (3-7) concepts at the level immediately below expenditures on acquisition of fixed assets (third group): renovation cost, and cost of fixtures purchased; (3-8) concepts at the level immediately below expenditures brought forward (third group): money transferred to retirement benefits reserve account, and transferred to benevolent find reserve account.

Note that the existing account items are not limited to those as illustrated, and other account item elements can be stored in the main memory device 19 as existing account items. For example, account item elements for forming a surplus statement, a surplus appropriation statement, supporting schedules for financial statements, an appropriation statement, a statement of loss disposition, a cash flow statement, consolidated financial statements, a general ledger, or the like, can be stored as existing account items. In addition to the existing account items stored in the main memory device 19, the system 10 can set a plurality of new account items for specifying new and arbitrary account item elements. The new account items are inputted to the system 10 by means of a keyboard, a ten-key unit, or a scanner, and memorized to the main memory device 19. In the system 10, there is no specific restriction on new account items, and new account items can be arbitrarily and freely set in accordance with accounting principles, and memorized to the main memory device 19. In the system 10, the existing account items and the new account items can be extracted in real time from the main memory device 19, and by using the extracted existing account items and new account items and setting values for those items, it is possible to construct a hierarchically-structured accounting database (hereinafter, referred to as an "accounting database") in which the items and the values are systematically related. As described above, the existing account items and the new account items are account item elements, and the values of the account items are also account item elements.

In the system 10, the existing account items and the new account items are invoked from the main memory device 19, and displayed on the screen of a liquid crystal display or CRT, and a mouse is used to select the account items, and drag and drop them into an item entry area displayed on the screen, while entering an value per account item to a value entry area before specifying account item elements. Also, a keyboard is used to enter the new account items to the item entry area, and enter a value per new account item to the value entry area before specifying account item elements. Furthermore, the correspondence between the account items is entered to a consolidated relationship entry area displayed on the screen, thereby specifying systematic consolidated relationships between the account items. Note that the screen displays a start indicator entry area, a time entry area, and a close date entry area, as well as the item entry area, the value entry area, and the consolidated relationship entry area.

The item entry area and the value entry area are displayed on the screen with classifications from the first to n'th groups. When the account items are entered to the item entry area, a primary flag representing the first group, a secondary flag representing the second group, or an n-ary flag representing the n'th group is automatically set per account item. In addition, when the values of the account items are entered to the value entry area, the primary flag, the secondary flag, or the n-ary flag is automatically set per value. The central processing unit 18 classifies the account items and the values individually associated with their respective account items into the first to n'th groups in accordance with the primary to n-ary flags, and outputs them to the auxiliary memory device 13. The auxiliary memory device 13 stores the account items and the values to the item master 20 with the classifications from the first to n'th groups (account item element memory means). The account items and the values are memorized in the master 20 chronologically from the past to the present. The central processing unit 18 outputs consolidated relationships between the account items to the auxiliary memory device 13. The auxiliary memory device 13 stores the consolidated relationships to the configuration master 21 (consolidated relationship memory means). The consolidated relationships between the account items are memorized in the master 21 chronologically from the past to the present.

In an example of memorizing the existing account items, the new account items, the values, and the consolidated relationships to the master 20, 21, at the present, the account items and the values are entered to the item entry area and the value entry area, respectively, the consolidated relationships between the account items are entered to the consolidated relationship entry area, and a start indicator that indicates the present time point (a start indicator that indicates a point at which an account item element has been incorporated into the hierarchically-structured accounting database base) is entered to the start indicator entry area displayed on the screen. The central processing unit 18 sets the start indicator for the account items, and classifies the account items and the values into the first to n'th groups in accordance with the primary to n-ary flags before outputting them to the auxiliary memory device 13, thereby memorizing the account items, the values, and the consolidated relationships to the master 20, 21. In accordance with an instruction from the central processing unit 18, the auxiliary memory device 13 stores the account items, for which the start indicator has been set, and the values to the item master 20 with the classifications from the first to n'th groups, while storing the consolidated relationships to the configuration master 21.

After the existing account items, the new account items, the values, and the start indicator are stored to the master 20, and the consolidated relationships between the account items are stored to the master 21, when a given point in the past, or the present time point, is entered to the time entry area, and an accounting database generation request is inputted, the system 10 generates, in real time, an accounting database as of the given point in the past or at the present using the account item elements based on the consolidated relationships between the account item elements, such that the account item elements (values) are aggregated in accordance with accounting principles (database generation means). In addition, when an accounting database output request is inputted, the generated accounting database is outputted in real time by the output device 15 (database output means). The system 10 is capable of generating a plurality of accounting database bases as of any given points, either in the past or both in the past and present, based on the existing account items, the new account items, and the values, which are memorized in the masters. In the system 10, when a given time point is entered to the close date entry area as a close date, the central processing unit 18 then sets an end indicator (an end indicator that indicates a point at which an account item element has been excluded from the hierarchically-structured accounting database) for the existing account items and the new account items. The account items, for which the end indicator has been set, will not be contained in the accounting database from the setting time of the end indicator onward. Here, the start indicator and the end indicator are in units that represent time, which may be either only a date or a date and time. The time may be represented in units of hour, minute or second. Note that the value is associated with its corresponding account item, and therefore by setting, for each account item, the consolidated relationship, the start indicator and the end indicator, it becomes possible to clarify a point at which the consolidated relationship and the value have been incorporated into the accounting database, and a point at which the value has been excluded from the accounting database. Accordingly, as for the value, it is not necessary to enter the consolidated relationship and the start indicator, and the start indicator and the end indicator are not set for the value.

The system 10 is capable of generating, in real time, an accounting database with at least one of the classifications from the first to n'th groups (database generation means), and outputting, in real time, the accounting database generated with at least one of the classifications from the first to n'th groups (database output means). Here, generating and outputting the accounting database with at least one of the classifications from the first to n'th groups means, for example, that if account item elements are memorized in the master 20 with classifications from the first to fourth groups, the accounting database is generated and outputted with only the second group, the first to third groups, or the second and fourth groups.

When a given period in the past or up to the present is designated, the system 10 is capable of generating, in real time, an accounting database based on account item elements present in the designated period, such that the account item elements (values) in the designated period are added or subtracted (database generation means), and the system 10 is also capable of outputting, in real time, the accounting database based on the account item elements present in the designated period (database output means). For example, based on account item elements in a given three-month period retroactive from the present, it is possible to generate and output an accounting database in which the account item elements (values) in that three-month period are aggregated. In addition, by canceling an end indicator from account item elements for which the end indicator is set quarterly, it is possible to generate and output an accounting database in which account item elements (values) in the whole quarter are aggregated, based on account item elements present all through the quarter.

In the system 10, new account items and values can be added at the present time point to the master 20 having memorized some account items and values, and the account items and values that have already been memorized in the master 20 can be changed/deleted at the present time point (account item modification means). In addition, it is possible to add new account items and values to the master 20, which has already memorized some account items and values, retroactively from the present, as well as to change/delete the account items and values that have already been memorized in the master 20, retroactively from the present (account item modification means). In examples of retroactively adding, changing, or deleting account items and values, a given point in the past is entered to the time entry area. Once the given point in the past is entered, records memorized in the master 20, 21, are displayed on the screen of the output device 15, retroactively to that given point in the past, and the item entry area, the value entry area, the consolidated relationship entry area, and the start indicator entry area for the given point in the past are displayed on the screen of the output device 15.

In an example of adding account items and values to the master 20 at the present time point, the account items and values that are to be added are entered to the item entry area and the value entry area, respectively, consolidated relationships between the added account items and other account items are entered to the consolidated relationship entry area, and a start indicator that indicates the present time point (the time of addition) is entered to the start indicator entry area. The central processing unit 18 sets the start indicator for each of the added account items, and outputs the added account items and values, along with the consolidated relationships between the added account items and other account items, to the auxiliary memory device 13, thereby memorizing them to the master 20, 21. In accordance with an instruction from the central processing unit 18, the auxiliary memory device 13 stores the added account items, for which the start indicator has been set, to the master 20, 21, along with the values and the consolidated relationships. By adding the account items and the values at the present time point, the records memorized in the master 20, 21, are updated, but the records that have already been memorized before the addition (before the updating) are maintained in the master 20, 21, without any modification.

In an example of retroactively adding account items and values to the master 20, a given point in the past is entered to the time entry area, the account items and values that are to be added are respectively entered to the item entry area and the value entry area for that given point in the past, consolidated relationships between the added account items and other account items are entered to the consolidated relationship entry area for the given point in the past, and a start indicator that indicates the given point in the past is entered to the start indicator entry area. The central processing unit 18 sets the start indicator for each of the added account items, and outputs the added account items and values, along with the consolidated relationships between the added account items and other account items, to the auxiliary memory device 13, thereby memorizing them to the master 20, 21. In accordance with an instruction from the central processing unit 18, the auxiliary memory device 13 refers to time data entered in the time entry area and time data for the start indicator, and stores the added account items, for which the start indicator has been set, along with the values and the consolidated relationships, to the records memorized in the master 20, 21, retroactively to the time of addition in the past. By retroactively adding the account items and the values, the added account items, along with their values and consolidated relationships, are incorporated into the records currently memorized in the master 20, 21, and also into the memorized records that have been present since the time of addition up to the present, so that the memorized records that have been present since the time of addition up to the present are updated (automatic modification means). The records that have already been memorized before the addition (before the updating) are maintained in the master 20, 21, without any modification.

In an example of changing account items and values at the present time point, the account items that are to be changed are displayed and changed in the item entry area, and the values that are to be changed are displayed and changed in the value entry area. Furthermore, consolidated relationships between the changed account items and other account items are entered to the consolidated relationship entry area, and a start indicator that indicates the present time point (the time of changing) to the start indicator entry area. The central processing unit 18 sets the start indicator for each of the changed account items, erases the pre-change account items, along with their values and consolidated relationships, from the master 20, 21, and outputs the changed account items, along with their values and consolidated relationships, to the auxiliary memory device 13, thereby memorizing them to the master 20, 21. In accordance with an instruction from the central processing unit 18, the auxiliary memory device 13 erases the pre-change account items, along with their values and consolidated relationships, from the master 20, 21, and stores the changed account items, for which the start indicator has been set, along with their values and consolidated relationships, to the master 20, 21. By changing the account items and the values at the present time point, the records memorized in the master 20, 21, are updated, but the records that have already been memorized before the changing (before the updating) are maintained in the master 20, 21, without any modification. When account items and values that belong to a high-level concept are changed at the present time point, the central processing unit 18 automatically erases, from the master 20, 21, account items, values, and consolidated relationships within lower-level concepts that are to be changed to accord with the changed account items and values within the high-level concept (automatic modification means). In a concrete example of this, when account items and values that belong to the second group are changed, other account items, values, and consolidated relationships in the third and subsequent groups that are to be changed to accord with the changed account items and values are erased from the master 20, 21. New account items and values within the lower-level concepts that correspond to the changed account items and values are reentered to the item entry area and the value entry area, respectively, consolidated relationships between the account items are entered to the consolidated relationship entry area, and a start indicator is entered to the start indicator entry area.

In an example of retroactively changing account items and values, a given point in the past is entered to the time entry area, the account items that are to be changed are displayed and changed in the item entry area for that given point in the past, and the values that are to be changed are displayed and changed in the value entry area for the given point in the past. Furthermore, consolidated relationships between the changed account items and other account items are entered to the consolidated relationship entry area for the given point in the past, and a start indicator that indicates the given point in the past is entered to the start indicator entry area. The central processing unit 18 sets the start indicator for each of the changed account items, erases the pre-change account items, along with their values and consolidated relationships, from the master 20, 21, outputs the changed account items, along with their values, and the consolidated relationships between the changed account items and other account items, to the auxiliary memory device 13, thereby memorizing them to the master 20, 21. In accordance with an instruction from the central processing unit 18, the auxiliary memory device 13 erases the pre-change account items, along with their values and consolidated relationships, from the master 20, 21, and stores the changed account items, for which the start indicator has been set, along with their values and consolidated relationships, to the records memorized in the master 20, 21, retroactively to the time of changing in the past. By retroactively changing the account items and the values, the changed account items, along with their values and consolidated relationships, are incorporated into the records currently memorized in the master 20, 21, and also into the memorized records that have been present since the time of changing up to the present, so that the memorized records that have been present since the time of changing up to the present are updated (automatic modification means). That is, account items, values, and consolidated relationships in the same group as the changed account items and values that have been present since the time of changing in the past up to the present and are to be changed to accord with the changed account items and values are automatically changed. The records that have already been memorized before the changing (before the updating) are maintained in the master 20, 21, without any modification.

When account items and values that belong to a high-level concept are retroactively changed, the central processing unit 18 automatically erases account items, values, and consolidated relationships within lower-level concepts that have been present since the time of changing up to the present and are to be changed to accord with the changed account items and values within the high-level concept (automatic modification means). In a concrete example of this, when account items and values that belong to the second group are changed, other account items, values, and consolidated relationships in the third and subsequent groups that have been present since the time of changing in the past up to the present and are to be changed to accord with the changed account items and values are erased from the master 20, 21. New account items and values within the lower-level concepts that are associated with the changed account items and values are reentered to the item entry area and the value entry area, respectively, consolidated relationships between the account items are entered to the consolidated relationship entry area, and a start indicator is entered to the start indicator entry area. The new account items, values, and consolidated relationships within the lower-level concepts that are associated with the changed account items and values are processed as additions.

In an example of deleting account items and values at the present time point, the account items that are to be deleted are displayed and deleted in the item entry area, and the values that are to be deleted are displayed and deleted in the value entry area. The central processing unit 18 erases the deleted account items, along with their values and consolidated relationships, from the master 20, 21. In accordance with an instruction from the central processing unit 18, the auxiliary memory device 13 erases the deleted account items, along with their values and consolidated relationships, from the master 20, 21. When the account items, the values, and the consolidated relationships are deleted at the present time point, the records memorized in the master 20, 21, are updated, but the records that have already been memorized before the deletion (before the updating) are maintained in the master 20, 21, without any modification. When account items and values that belong to a high-level concept are deleted at the present time point, the central processing unit 18 automatically erases, from the master 20, 21, account items and values that belong to lower-level concepts and are to be deleted to accord with the deleted account items and values within the high-level concept, along with the consolidated relationships (automatic modification means). In a concrete example of this, when account items and values that belong to the second group are deleted, other account items, values, and consolidated relationships in the third and subsequent groups that are to be deleted to accord with the deleted account items and values are erased from the master 20, 21.

In an example of retroactively deleting account items and values, a given point in the past is entered to the time entry area, the account items that are to be deleted are displayed and deleted in the item entry area for that given point in the past, and the values that are to be deleted are displayed and deleted in the value entry area for the given point in the past. The central processing unit 18 causes the deleted account items to be erased from the master 20, 21, along with their values and consolidated relationships. In accordance with an instruction from the central processing unit 18, the auxiliary memory device 13 erases the deleted account items, along with their values and consolidated relationships, from the master 20, 21, retroactively to the time of deletion in the past. When the account items, the values, and the consolidated relationships are retroactively deleted, the account items that are to be deleted, along with their values and consolidated relationships, are deleted not only from the records currently memorized in the master 20, 21, but also from the memorized records that have been present since the time of deletion up to the present, so that the records memorized in the master 20, 21 are updated (automatic modification means). That is, account items, values, and consolidated relationships in the same group as the deleted account items and values that have been present since the time of deletion in the past up to the present and are to be deleted to accord with the deleted account items, values, and consolidated relationships are automatically deleted. The records that have already been memorized before the deletion (before the updating) are maintained in the master 20, 21, without any modification. When account items and values that belong to a high-level concept are retroactively deleted, the central processing unit 18 automatically erases, from the master 20, 21, account items, values, and consolidated relationships within lower-level concepts that have been present since the time of deletion up to the present and are to be deleted to accord with the deleted account items and values within the high-level concept (automatic modification means). In a concrete example of this, when account items and values that belong to the second group are deleted, other account items, values, and consolidated relationships in the third and subsequent groups that have been present since the point of deletion up to the present and are to be deleted to accord with the deleted account items and values are erased from the master 20, 21.

Figure 2:
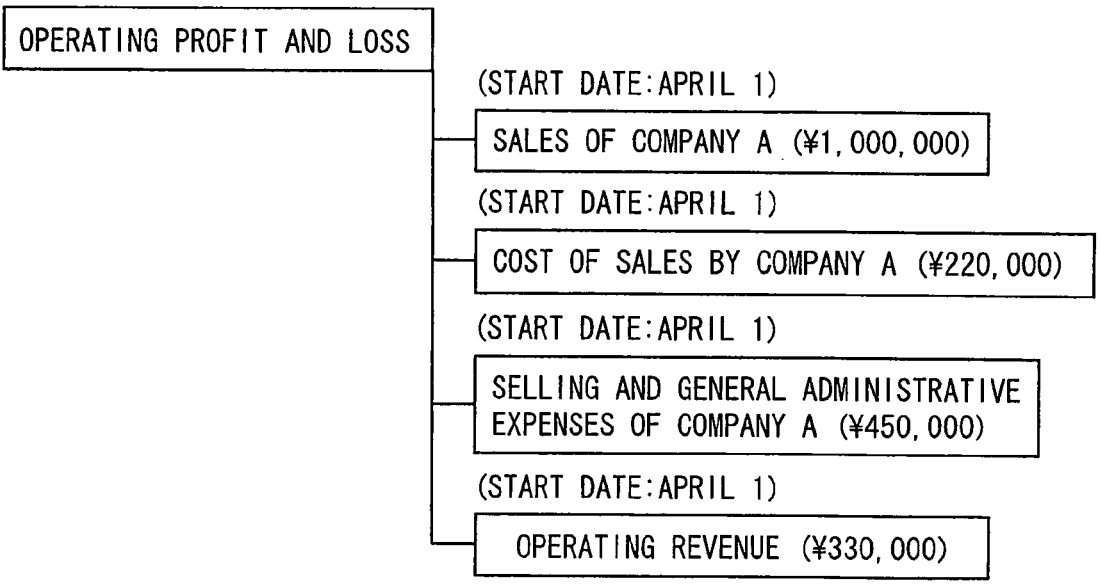
FIG. 2 is a diagram of a hierarchically-structured accounting database as of April 1, xx.
Figure 7:
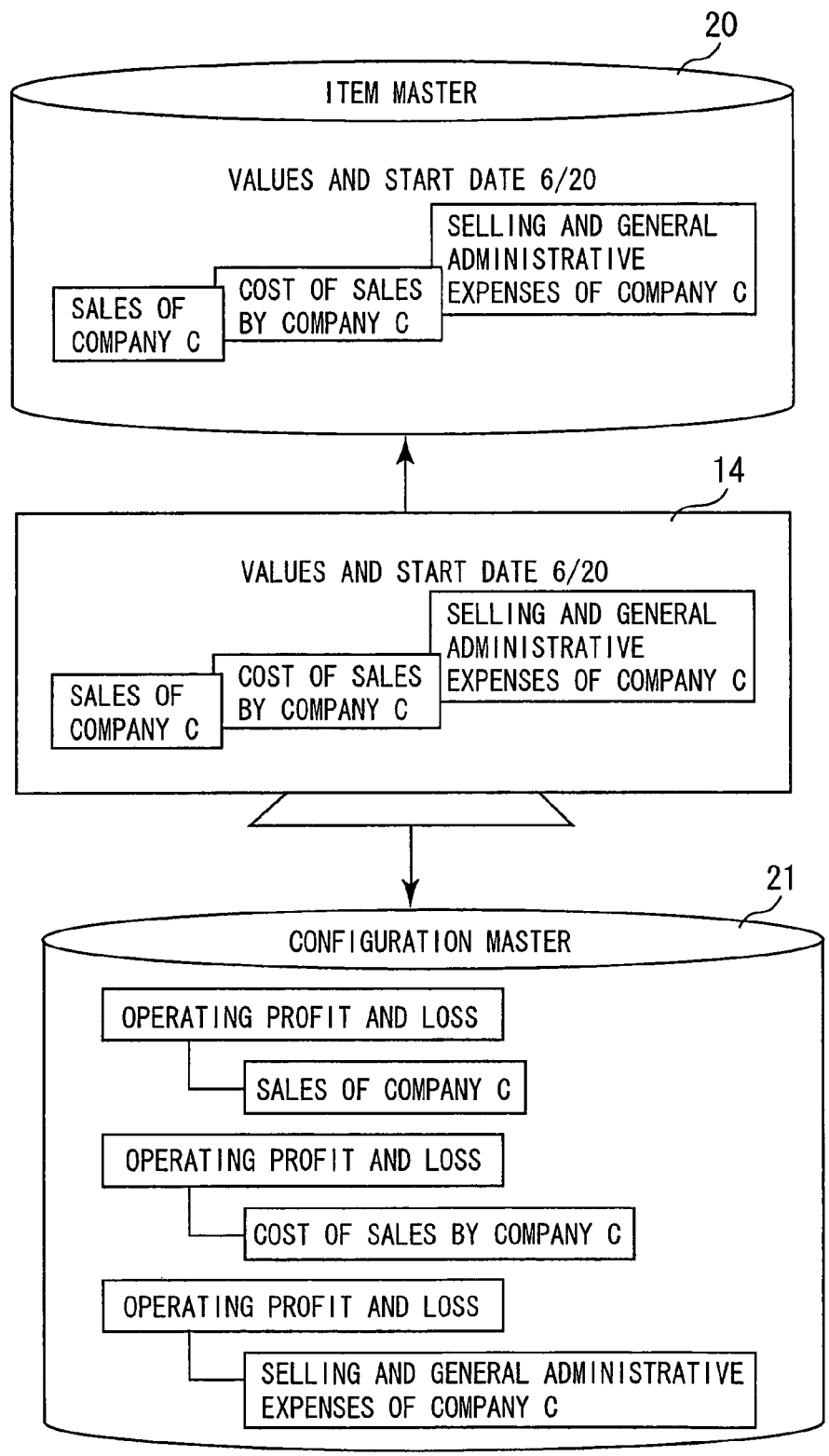
FIG. 7 is a schematic diagram for the masters, which corresponds to FIG. 6.
Figure 8:
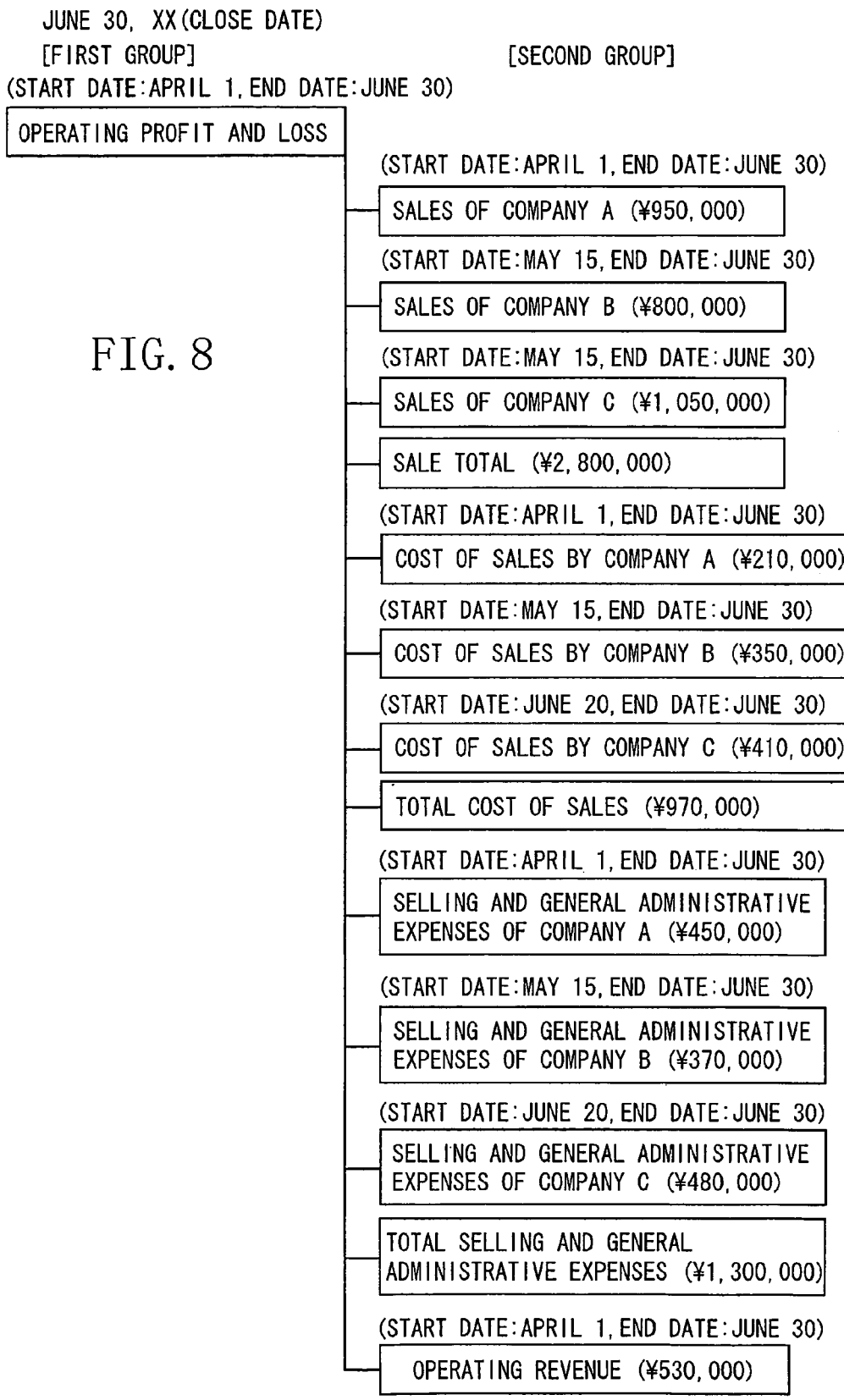
FIG. 8 is a diagram of a hierarchically-structured accounting database as of June 30, xx.

FIGS. 2, 4, 6, and 8 are diagrams chronologically illustrating exemplary accounting databases. FIGS. 3, 5, 7, and 9 are schematic diagrams in which the masters 20 and 21 have some account item elements and consolidated relationships memorized therein. FIG. 2 shows the accounting database as of April 1, xx, FIG. 4 shows the accounting database as of May 15, xx, FIG. 6 shows the accounting database as of June 20, xx, and FIG. 8 shows the accounting database as of June 30, xx (close date). Note that FIG. 3 corresponds to FIG. 2, and FIG. 5 corresponds to FIG. 4. FIG. 7 corresponds to FIG. 6, and FIG. 9 corresponds to FIG. 8. In this embodiment, a profit and loss statement is taken as an example of the accounting database, and furthermore, for ease of explanation, only the operating profit and loss in the profit and loss statement is shown. Note that the account item management system 10 will be described with reference to FIGS. 2 to 9 on the premise that the system 10 is operating on June 30, xx, and FIGS. 2, 4, and 6 show the accounting databases in the past. In addition, it is premised that the first accounting database was prepared on April 1, xx.

In FIGS. 2, 4, 6, and 8, the accounting databases have the account item elements arranged from the first to the second group, but the grouping into the first and second groups is not restrictive, and the account item elements may be arranged beyond the second group. Note that the account item elements in the figures are operating profit and loss, sales of company A, sales of company B, sales of company C, sale total, cost of sales by company A, cost of sales by company B, cost of sales by company C, total cost of sales, selling and general administrative expenses of company A, selling and general administrative expenses of company B, selling and general administrative expenses of company C, total selling and general administrative expenses, operating revenue, and their values.

In the accounting database shown in FIG. 2, the operating profit and loss, the sales of company A, the cost of sales by company A, the selling and general administrative expenses of company A, the operating revenue, and their values are account item elements, and the sales of company A, the cost of sales by company A, the selling and general administrative expenses of company A, and the operating revenue are linked to the operating profit and loss to form a hierarchical structure. The operating profit and loss is an account item element in the first group, while the sales of company A, the cost of sales by company A, the selling and general administrative expenses of company A, and the operating revenue belong to the second group for the concepts at the level immediately below the operating profit and loss. As of April 1, xx, the value of the sales of company A is (¥1,000,000), the value of the cost of sales by company A is (¥220,000), and the value of the selling and general administrative expenses of company A is (¥450,000). The operating revenue as of April 1, xx is equivalent to a value (¥330,000) obtained by subtracting the cost of sales by company A and the selling and general administrative expenses of company A from the sales of company A. For the operating profit and loss, the sales of company A, the cost of sales by company A, the selling and general administrative expenses of company A, and the operating revenue, the start date April 1 (start indicator) that indicates the time of integration into the accounting database is set.

Figure 3:
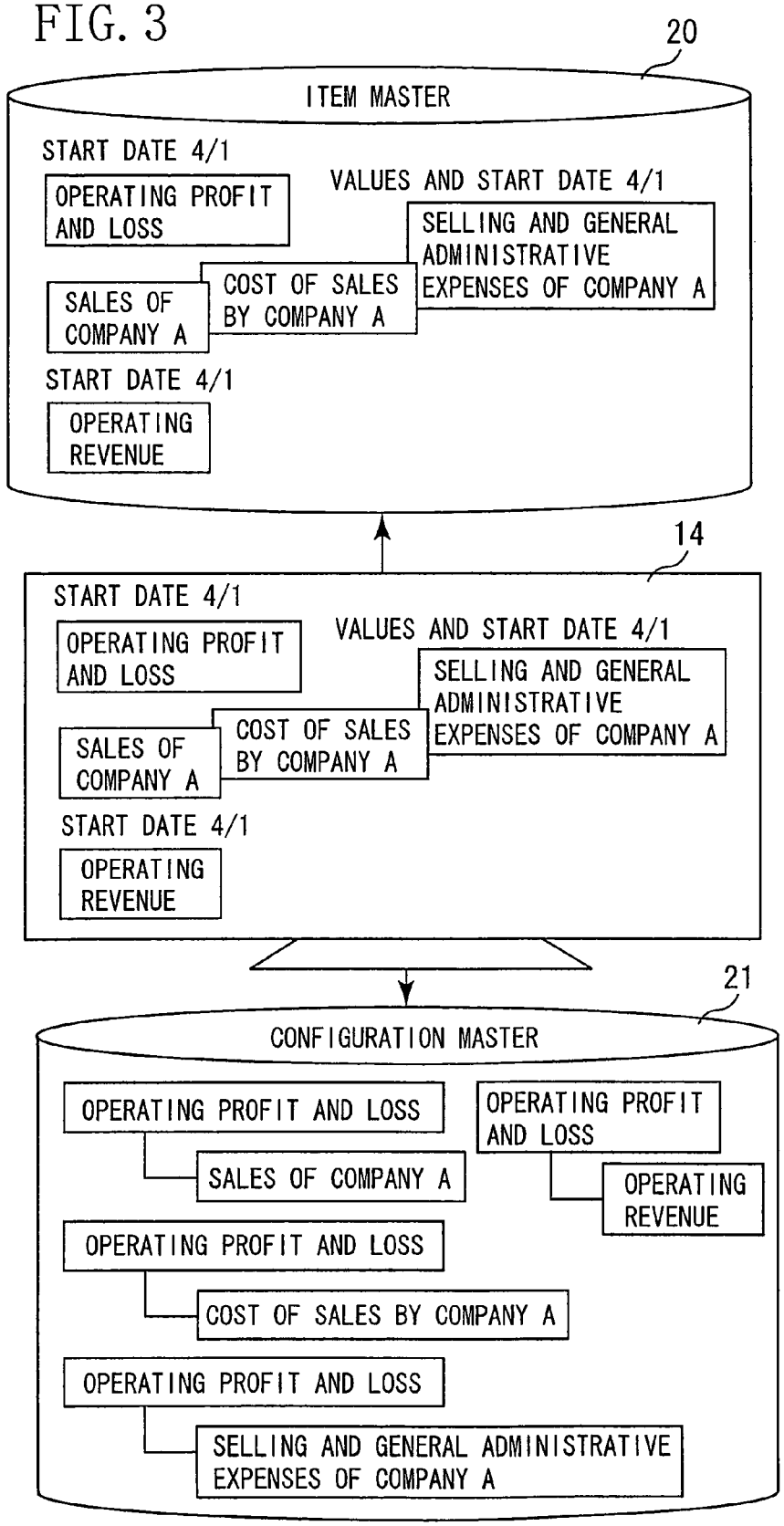
FIG. 3 is a schematic diagram for masters, which corresponds to FIG. 2.

In the system 10, as shown in FIG. 3, the operating profit and loss, the sales of company A, the cost of sales by company A, the selling and general administrative expenses of company A, and the operating revenue are entered to the item entry area (not shown) by means of the input device 14, and their values and start date April 1 (start indicator) are respectively entered to the value entry area (not shown) and the start indicator entry area (not shown) by means of the input device 14. For the operating profit and loss, the sales of company A, the cost of sales by company A, the selling and general administrative expenses of company A, and the operating revenue, the start date April 1 is set by the central processing unit 18. The operating profit and loss, the sales of company A, the cost of sales by company A, the selling and general administrative expenses of company A, the operating revenue, and their values are transferred from the central processing unit 18 to the auxiliary memory device 13, and stored to the item master 20 (data memory means). The operating profit and loss and the operating revenue are existing account items, which are extracted from the main memory device 19 and entered to the item entry area. The sales of company A, the cost of sales by company A, and the selling and general administrative expenses of company A are new and arbitrary account item elements that are specified by new account items, and they are entered to the item entry area using a keyboard, and stored to the main memory device 19.

Next, systematic consolidated relationships of the sales of company A, the cost of sales by company A, the selling and general administrative expenses of company A, and the operating revenue with respect to the operating profit and loss are entered to the consolidated relationship entry area (not shown) by means of the input device 14. At this time, only the correspondence between those account item elements and account item elements within the next concepts at the level immediately therebelow is entered. Specifically, only the correspondence between account item elements that belong to the first group and account item element that belong to the second group for the concepts at the level immediately therebelow is entered, and the correspondence between the account item elements that belong to the first group and account item elements that belong to the third group is not entered. The consolidated relationships of the sales of company A, the cost of sales by company A, the selling and general administrative expenses of company A, and the operating revenue with respect to the operating profit and loss are transferred from the central processing unit 18 to the auxiliary memory device 13, and stored to the configuration master 21 (data memory means). Once the consolidated relationships are entered, the operating profit and loss and the sales of company A are correlated to each other, and the operating profit and loss and the cost of sales by company A are correlated to each other. Furthermore, the operating profit and loss and the selling and general administrative expenses of company A are correlated to each other, and the operating profit and loss and the operating revenue are correlated to each other. As a result, it becomes apparent that: the sales of company A, the cost of sales by company A, the selling and general administrative expenses of company A, and the operating revenue are present as the concepts at the level immediately below the operating profit and loss; the operating profit and loss is formed by the sales of company A, the cost of sales by company A, the selling and general administrative expenses of company A, and the operating revenue; and the operating revenue is equivalent to a value obtained by subtracting the cost of sales by company A and the selling and general administrative expenses of company A from the sales of company A. Note that in the system 10, predetermined calculation formulae (functions) can be set and stored to the main memory device 19, so that addition, subtraction, multiplication and division of account item elements can be carried out by the stored calculation formulae in accordance with accounting principles. In this system 10, the operating revenue is automatically calculated by the calculation formulae.

After the operating profit and loss, the sales of company A, the cost of sales by company A, the selling and general administrative expenses of company A, the operating revenue, the values, and the consolidated relationships are stored to the masters, when April 1, xx is entered to the time entry area, and an accounting database preparation request is inputted, the system 10 automatically generates the accounting database as of April 1, xx in FIG. 2 (database generation means). In the system 10, when the values for sales, cost of sales, and selling and general administrative expenses are entered, the operating revenue is automatically calculated by the pre-stored calculation formulae. In the system 10, the generated accounting database as of April 1, xx is stored to the main memory device 19 and the auxiliary memory device 13. When an accounting database output request is inputted, the system 10 outputs the generated accounting database as of April 1, xx via a liquid crystal display, a CRT, or a printer (database output means). The system 10 is capable of generating the accounting database as of April 1, xx in real time at any time on or after April 1, xx (database generation means), and outputting the generated accounting database as of April 1, xx in real time at any time on or after April 1, xx (database output means).

When compared to the accounting database as of April 1, xx, the accounting database as of May 15, xx, as shown in FIG. 4, additionally contains sales of company B, cost of sales by company B, selling and general administrative expenses of company B, and their values (account item modification means). In the accounting database shown in FIG. 4, the operating profit and loss, the sales of company A, the sales of company B, the cost of sales by company A, the cost of sales by company B, the selling and general administrative expenses of company A, the selling and general administrative expenses of company B, the operating revenue, and their values are account item elements, and the sales of company A, the sales of company B, the cost of sales by company A, the cost of sales by company B, the selling and general administrative expenses of company A, the selling and general administrative expenses of company B, and the operating revenue are linked to the operating profit and loss to form a hierarchical structure. The sales of company B, the cost of sales by company B, and the selling and general administrative expenses of company B belong to the second group for the concepts at the level immediately below the operating profit and loss. The value of the sales of company B, the value of the cost of sales by company B, and the value of the selling and general administrative expenses of company B, as added on May 15, xx, are respectively (¥800,000), (¥350,000), and (¥370,000). The operating revenue as of May 15, xx is equivalent to a value (¥410,000) obtained by subtracting the costs of sales by companies A and B, and the selling and general administrative expenses of companies A and B from the sales obtained by adding up the sales of company A and the sales of company B. For the sales of company B, the cost of sales by company B, and the selling and general administrative expenses of company B, the start date May 15 (start indicator) that indicates the time integration into the accounting database is set.

Figure 5:
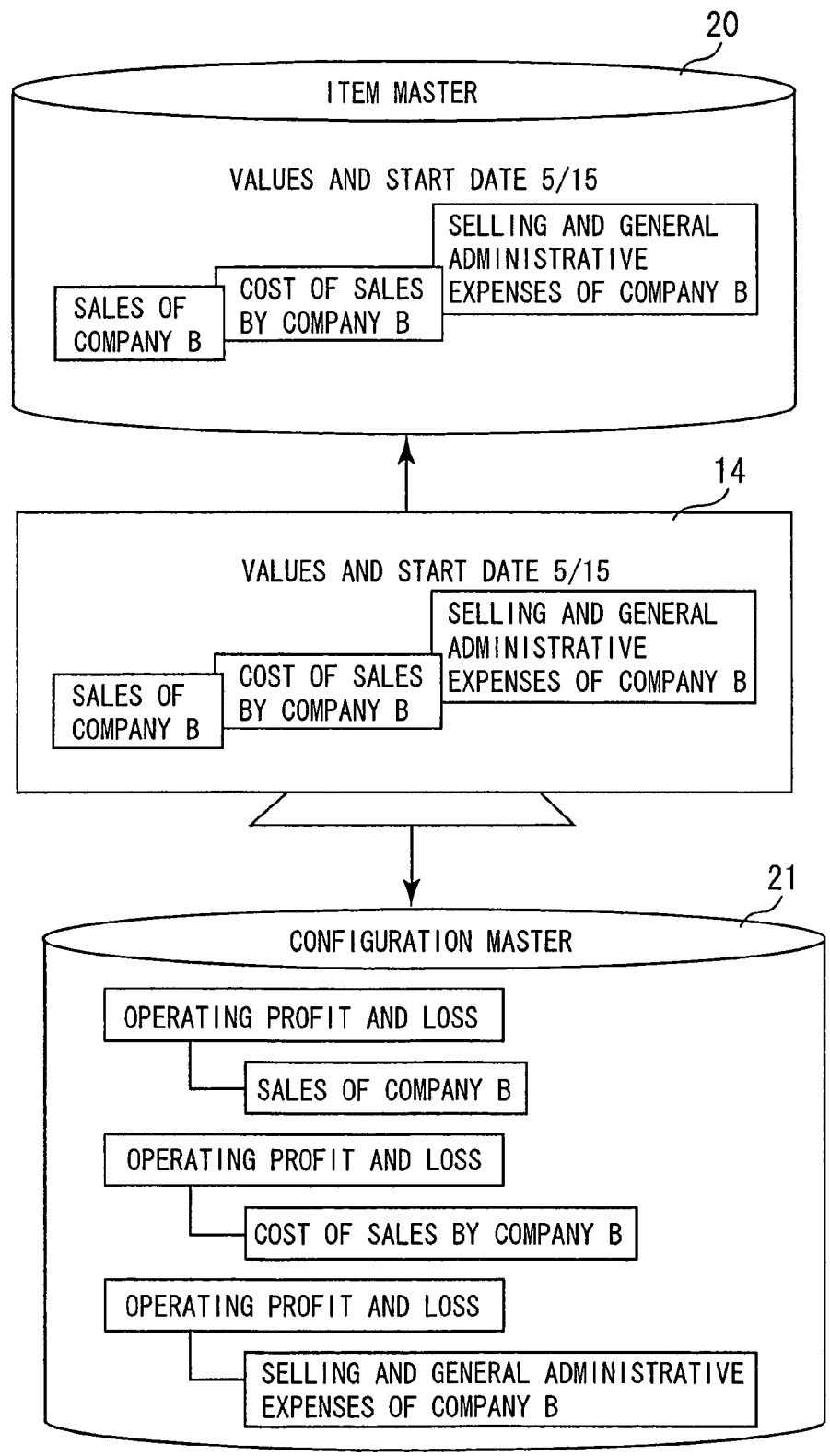
FIG. 5 is a schematic diagram for the masters, which corresponds to FIG. 4.

In the system 10, as shown in FIG. 5, the sales of company B, the cost of sales by company B, and the selling and general administrative expenses of company B are entered to the item entry area by means of the input device 14, and their values and start date May 15 (start indicator) are respectively entered to the value entry area and the start indicator entry area by means of the input device 14. For the sales of company B, the cost of sales by company B, and the selling and general administrative expenses of company B, the start date May 15 is set by the central processing unit 18. The sales of company B, the cost of sales by company B, the selling and general administrative expenses of company B, and their values are transferred from the central processing unit 18 to the auxiliary memory device 13, and stored to the item master 20 (data memory means). The sales of company B, the cost of sales by company B, and the selling and general administrative expenses of company B are new and arbitrary account item elements specified by new account items, and they are entered to the item entry area using a keyboard, and stored to the main memory device 19.

Next, systematic consolidated relationships of the sales of company B, the cost of sales by company B, and the selling and general administrative expenses of company B with respect to the operating profit and loss are entered to the consolidated relationship entry area by means of the input device 14. The consolidated relationships of the sales of company B, the cost of sales by company B, and the selling and general administrative expenses of company B with respect to the operating profit and loss are transferred from the central processing unit 18 to the auxiliary memory device 13, and stored to the configuration master 21 (data memory means). Once the consolidated relationships are entered, the operating profit and loss and the sales of company B are correlated to each other, the operating profit and loss and the cost of sales by company B are correlated to each other, and the operating profit and loss and the selling and general administrative expenses of company B are correlated to each other. As a result, it becomes apparent that: the sales of company B, the cost of sales by company B, and the selling and general administrative expenses of company B are present as the concepts at the level immediately below the operating profit and loss; the operating profit and loss is formed by the sales of company A, the sales of company B, the cost of sales by company A, the cost of sales by company B, the selling and general administrative expenses of company A, the selling and general administrative expenses of company B, and the operating revenue; and the operating revenue is equivalent to a value obtained by subtracting the costs of sales by companies A and B, and the selling and general administrative expenses of companies A and B from the sales obtained by adding up the sales of company A and the sales of company B.

After the sales of company B, the cost of sales by company B, and the selling and general administrative expenses of company B, along with their values and consolidated relationships, are stored to the master 20, 21, when May 15, xx is entered to the time entry area, and an accounting database preparation request is inputted, the system 10 automatically generates the database as of May 15, xx in FIG. 4 (accounting database generation means). The system 10 automatically calculates the operating revenue in accordance with the predetermined calculation formulae. The system 10 updates the memorized records as of April 1, xx on May 15, xx. The account item elements and consolidated relationships as of April 1, xx are maintained in the master 20, 21, as memorized records. Note that after the updating on May 15, xx, the master 20, 21, has memorized therein only the sales of company B, the cost of sales by company B, the selling and general administrative expenses of company B, their values, and the consolidated relationships for company B with the operating profit and loss. That is, only portions of the accounting database shown in FIG. 4 that are different from the accounting database in FIG. 2 are memorized in the item master 20 and the configuration master 21. In addition, the sales of company A, the sales of company B, the cost of sales by company A, the cost of sales by company B, the selling and general administrative expenses of company A, and the selling and general administrative expenses of company B, for which the start date (start indicator) has been set, are contained in the accounting database from the present onward, unless the end date (end indicator) is set for them. In the system 10, the generated accounting database as of May 15, xx can also be stored to the main memory device 19 and the auxiliary memory device 13. When an accounting database output request is inputted, the system 10 outputs the generated accounting database as of May 15, xx via a liquid crystal display, a CRT, or a printer (database output means). In the system 10, the accounting databases as of April 1, xx and May 15, xx can be generated in real time at any time on or after May 15, xx (database generation means), and the generated accounting databases as of April 1, xx and May 15, xx can be outputted in real time at any time on or after May 15, xx (database output means).

When compared to the accounting database as of May 15, xx, the accounting database as of June 20, xx, as shown in FIG. 6, additionally contains sales of company C, cost of sales by company C, selling and general administrative expenses of company C, and their values, and the value of the sales of company A and the value of the cost of sales by company A have been changed (account item modification means). In the accounting database shown in FIG. 6, the operating profit and loss, the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, the operating revenue, and their values are account item elements, and the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, and the operating revenue are linked to the operating profit and loss to form a hierarchical structure. The sales of company C, the cost of sales by company C, and the selling and general administrative expenses of company C belong to the second group for the concepts at the level immediately below the operating profit and loss. The value of the sales of company A and the value of the cost of sales by company A, as changed on June 20, xx, are respectively (¥950,000) and (¥210,000). The value of the sales of company C, the value of the cost of sales by company C, and the value of the selling and general administrative expenses of company C, as added on June 20, xx, are respectively (¥1,050,000), (¥410,000), and (¥480,000). The operating revenue as of June 20, xx is equivalent to a value (¥530,000) obtained by subtracting the costs of sales by companies A, B, and C, and the selling and general administrative expenses of companies A, B and C from the sales obtained by adding up the sales of company A, the sales of company B, and the sales of company C. For the sales of company C, the cost of sales by company C, and the selling and general administrative expenses of company C, the start date June 20 (start indicator) that indicates the time of integration into the accounting database is set.

In the system 10, as shown in FIG. 7, the sales of company C, the cost of sales by company C, and the selling and general administrative expenses of company C are entered to the item entry area by means of the input device 14, their values and start date June 20 (start indicator) are respectively entered to the value entry area and the start indicator entry area by means of the input device 14, and the value of the sales of company A and the value of the cost of sales by company A are entered to the value entry area. For the sales of company C, the cost of sales by company C, and the selling and general administrative expenses of company C, the start date June 20 is set by the central processing unit 18. The sales of company C, the cost of sales by company C, the selling and general administrative expenses of company C, their values, the value of the sales of company A, and the value of the cost of sales by company A are transferred from the central processing unit 18 to the auxiliary memory device 13, and stored to the item master 20 (data memory means). The sales of company C, the cost of sales by company C, and the selling and general administrative expenses of company C are new and arbitrary account item elements specified by new account items, and they are entered to the item entry area using a keyboard, and stored to the main memory device 19.

Next, systematic consolidated relationships of the sales of company C, the cost of sales by company C, and the selling and general administrative expenses of company C with respect to the operating profit and loss are entered to the consolidated relationship entry area by means of the input device 14. The consolidated relationships of the sales of company C, the cost of sales by company C, and the selling and general administrative expenses of company C with respect to the operating profit and loss are transferred from the central processing unit 18 to the auxiliary memory device 13, and stored to the configuration master 21 (data memory means).

Once the consolidated relationships are entered, the operating profit and loss and the sales of company C are correlated to each other, the operating profit and loss and the cost of sales by company C are correlated to each other, and the operating profit and loss and the selling and general administrative expenses of company C are correlated to each other. As a result, it becomes apparent that: the sales of company C, the cost of sales by company C, and the selling and general administrative expenses of company C are present as the concepts at the level immediately below the operating profit and loss; the operating profit and loss is formed by the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, and the operating revenue; and the operating revenue is equivalent to a value obtained by subtracting the costs of sales by companies A, B, and C, and the selling and general administrative expenses of companies A, B, and C from the sales obtained by adding up the sales of company A, the sales of company B, and the sales of company C.

After the sales of company C, the cost of sales by company C, and the selling and general administrative expenses of company C, along with their values and consolidated relationships, are stored to the master 20, 21, when June 20, xx is entered to the time entry area, and an accounting database preparation request is inputted, the system 10 automatically generates the accounting database as of June 20, xx in FIG. 6 (database generation means). The system 10 automatically calculates the operating revenue in accordance with the predetermined calculation formulae. The system 10 updates the memorized records as of May 15, xx on June 20, xx. As with the account item elements and consolidated relationships as of April 1, xx, the account item elements and consolidated relationships as of May 15, xx are maintained in the master 20, 21, as memorized records. Note that after the updating on June 20, xx, the master 20, 21, has memorized therein only the sales of company C, the cost of sales by company C, the selling and general administrative expenses of company C, their values, and the consolidated relationships for company C with the operating profit and loss (database memory means). That is, only portions of the accounting database shown in FIG. 6 that are different from the accounting database in FIG. 4 are memorized to the item master 20 and the configuration master 21. In addition, the sales of company A, the sales of company B, the sales of company C, the cost of sales by company A, the cost of sales by company B, the cost of sales by company C, the selling and general administrative expenses of company A, the selling and general administrative expenses of company B, and the selling and general administrative expenses of company C, for which the start date (start indicator) has been set, are contained in the accounting database from the present onward, unless the end date (end indicator) is set for them. In the system 10, the generated accounting database as of June 20, xx can also be memorized to the main memory device 19 and the auxiliary memory device 13. When an accounting database output request is inputted, the system 10 outputs the generated accounting database as of June 20, xx via a liquid crystal display, a CRT, or a printer (database output means). In the system 10, the accounting databases as of April 1, xx, May 15, xx, and June 20, xx can be generated in real time at any time on or after June 20, xx (database memory means), and the generated accounting databases as of April 1, xx, May 15, xx, and June 20, xx can be outputted in real time at any time on or after June 20, xx (database output means).

On the close date June 30, xx, the accounting database shown in FIG. 8 is prepared. When compared to the accounting database as of June 20, xx, the accounting database as of June 30, xx additionally contains sale total, which is obtained by aggregating the sales of companies A, B, and C, total cost of sales, which is obtained by aggregating the costs of sales by companies A, B, and C, total selling and general administrative expenses, which are obtained by aggregating the selling and general administrative expenses of companies A, B, and C (account item modification means). In the accounting database shown in FIG. 8, the operating profit and loss, the sales of company A, the sales of company B, the sales of company C, the sale total, the cost of sales by company A, the cost of sales by company B, the cost of sales by company C, the total cost of sales, the selling and general administrative expenses of company A, the selling and general administrative expenses of company B, the selling and general administrative expenses of company C, the total selling and general administrative expenses, the operating revenue, and their values are account item elements, and the sales of company A, the sales of company B, the sales of company C, the sale total, the cost of sales by company A, the cost of sales by company B, the cost of sales by company C, the total cost of sales, the selling and general administrative expenses of company A, the selling and general administrative expenses of company B, the selling and general administrative expenses of company C, the total selling and general administrative expenses, and the operating revenue are linked to the operating profit and loss to form a hierarchical structure. The sale total, the total cost of sales, and the total selling and general administrative expenses belong to the second group for the concepts at the level immediately below the operating profit and loss. As of June 30, xx, the sale total is (¥2,800,000), the total cost of sales is (¥970,000), and the total selling and general administrative expenses are (¥1,300,000). The operating revenue as of June 30, xx is equivalent to a value (¥530,000) obtained by subtracting the total cost of sales and the total selling and general administrative expenses from the sale total. For the sales of company A, the sales of company B, the sales of company C, the sale total, the cost of sales by company A, the cost of sales by company B, the cost of sales by company C, the total cost of sales, the selling and general administrative expenses of company A, the selling and general administrative expenses of company B, the selling and general administrative expenses of company C, the total selling and general administrative expenses, and the operating revenue, the end date June 30 (end indicator) that indicates the time of exclusion from the accounting database is set.

Figure 9:
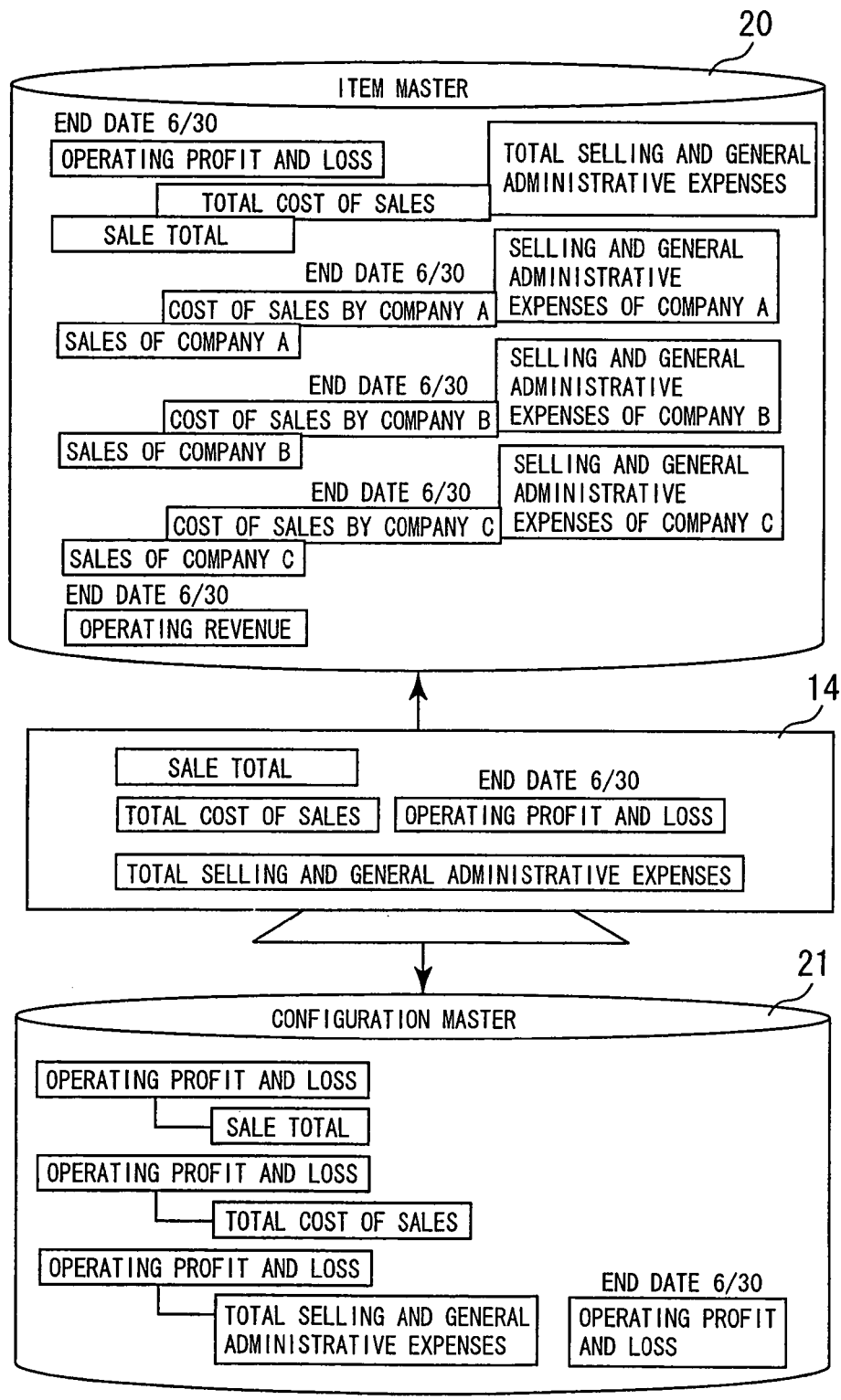
FIG. 9 is a schematic diagram for the masters, which corresponds to FIG. 8.

In the system 10, as shown in FIG. 9, the sale total, the total cost of sales, and the total selling and general administrative expenses are entered to the item entry area by means of the input device 14. The sale total, the total cost of sales, and the total selling and general administrative expenses are transferred from the central processing unit 18 to the auxiliary memory device 13, and stored to the item master 20 (data memory means). The sale total, the total cost of sales, and the total selling and general administrative expenses are existing account items, and they are extracted from the main memory device 19, and entered to the item entry area. Next, systematic consolidated relationships of the sale total, the total cost of sales, and the total selling and general administrative expenses with respect to the operating profit and loss are entered to the consolidated relationship entry area by means of the input device 14. The consolidated relationships of the sale total, the total cost of sales, and the total selling and general administrative expenses with respect to the operating profit and loss are transferred from the central processing unit 18 to the auxiliary memory device 13, and stored to the configuration master 21 (data memory means). Once the consolidated relationships are inputted, the operating profit and loss and the sale total are correlated to each other, the operating profit and loss and the total cost of sales are correlated to each other, and the operating profit and loss and the total selling and general administrative expenses are correlated to each other. As a result, it becomes apparent that: the sale total, the total cost of sales, and the total selling and general administrative expenses are present as the concepts at the level immediately below the operating profit and loss, and the operating profit and loss is formed by the sales of company A, the sales of company B, the sales of company C, the sale total, the cost of sales by company A, the cost of sales by company B, the cost of sales by company C, the total cost of sales, the selling and general administrative expenses of company A, the selling and general administrative expenses of company B, the selling and general administrative expenses of company C, the total selling and general administrative expenses, and the operating revenue.

In the system 10, the operating profit and loss is invoked, and the end date June 30, xx, which is the close date, is entered to the close date entry area. When June 30, xx is entered to the close date entry area, the central processing unit 18 then sets the end indicator for the operating profit and loss, and automatically sets the end indicator for other account item elements. In the system 10, the account item elements for which the end date has been set are not contained in the accounting database as of or after July 1, xx. After the end date June 30, xx is entered to the close date entry area, when an accounting database preparation request is inputted, the system 10 automatically generates the accounting database as of the close date in FIG. 8 (database generation means). The system 10 automatically calculates the sale total, the total cost of sales, the total selling and general administrative expenses, and the operating revenue in accordance with the predetermined calculation formulae. The system 10 updates the memorized records as of June 20, xx on June 30, xx. As with the account item elements and consolidated relationships as of April 1, xx and the account item elements and consolidated relationships as of May 15, xx, the account item elements and consolidated relationships as of June 20, xx are maintained in the master 20, 21, as memorized records. Note that after the updating on June 30, xx, the master 20, 21, has memorized therein the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, and the operating revenue, for which end indicator has been set (data memory means).

In the system 10, the generated accounting database as of June 30, xx can also be memorized to the main memory device 19 and the auxiliary memory device 13. When an accounting database output request is inputted, the system 10 outputs the generated accounting database as of June 30, xx via a liquid crystal display, a CRT, or a printer (database output means). In the system 10, the accounting databases as of April 1, xx, May 15, xx, June 20, xx, and June 30, xx can be generated in real time at any time on or after June 30, xx (database memory means), and the generated accounting databases as of April 1, xx, May 15, xx, June 20, xx, and June 30, xx can be outputted in real time at any time on or after June 30, xx (database output means).

Figure 10:
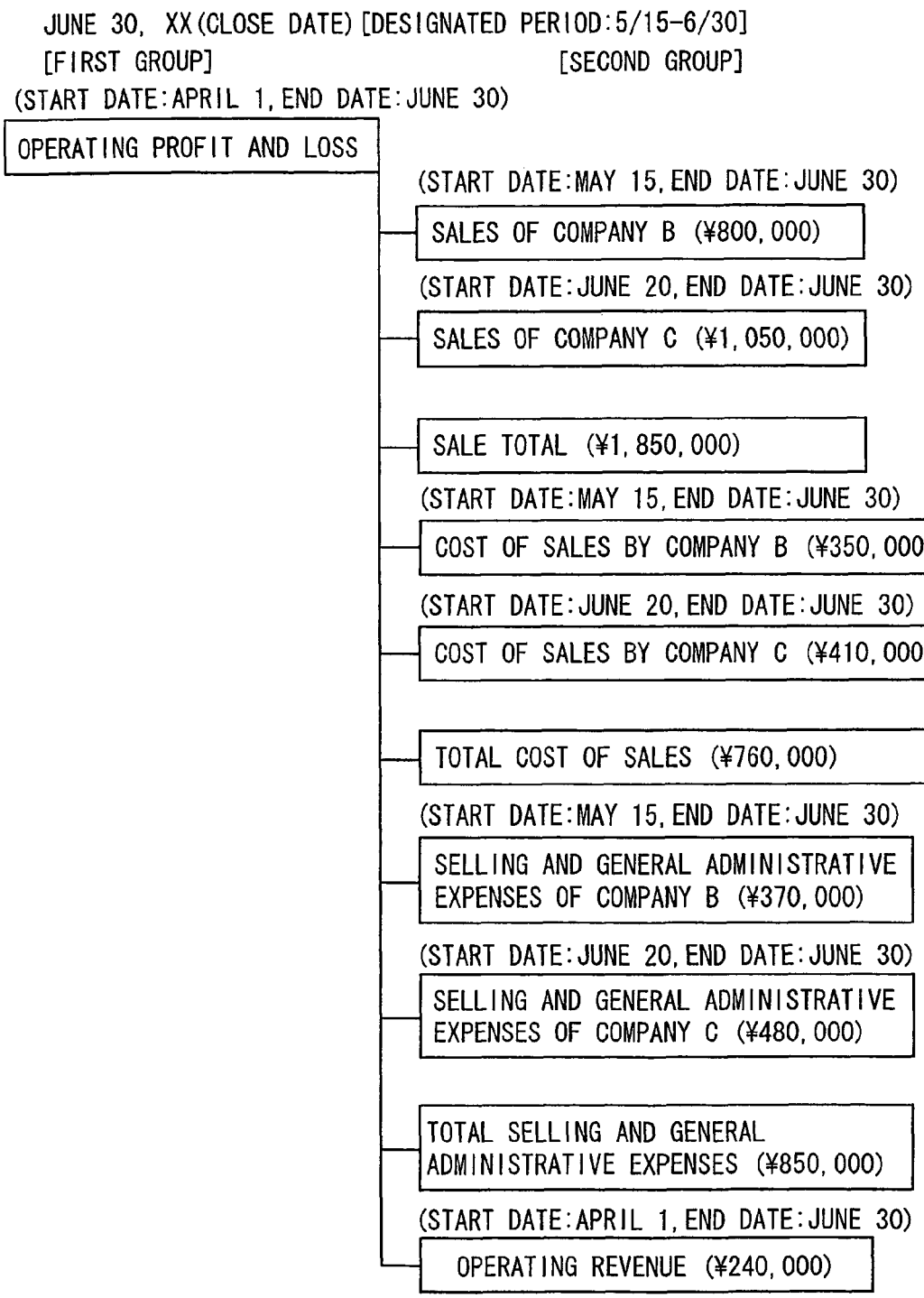
FIG. 10 is a diagram of the hierarchically-structured accounting database as of June 30, xx where a designated period is entered.
Figure 11:
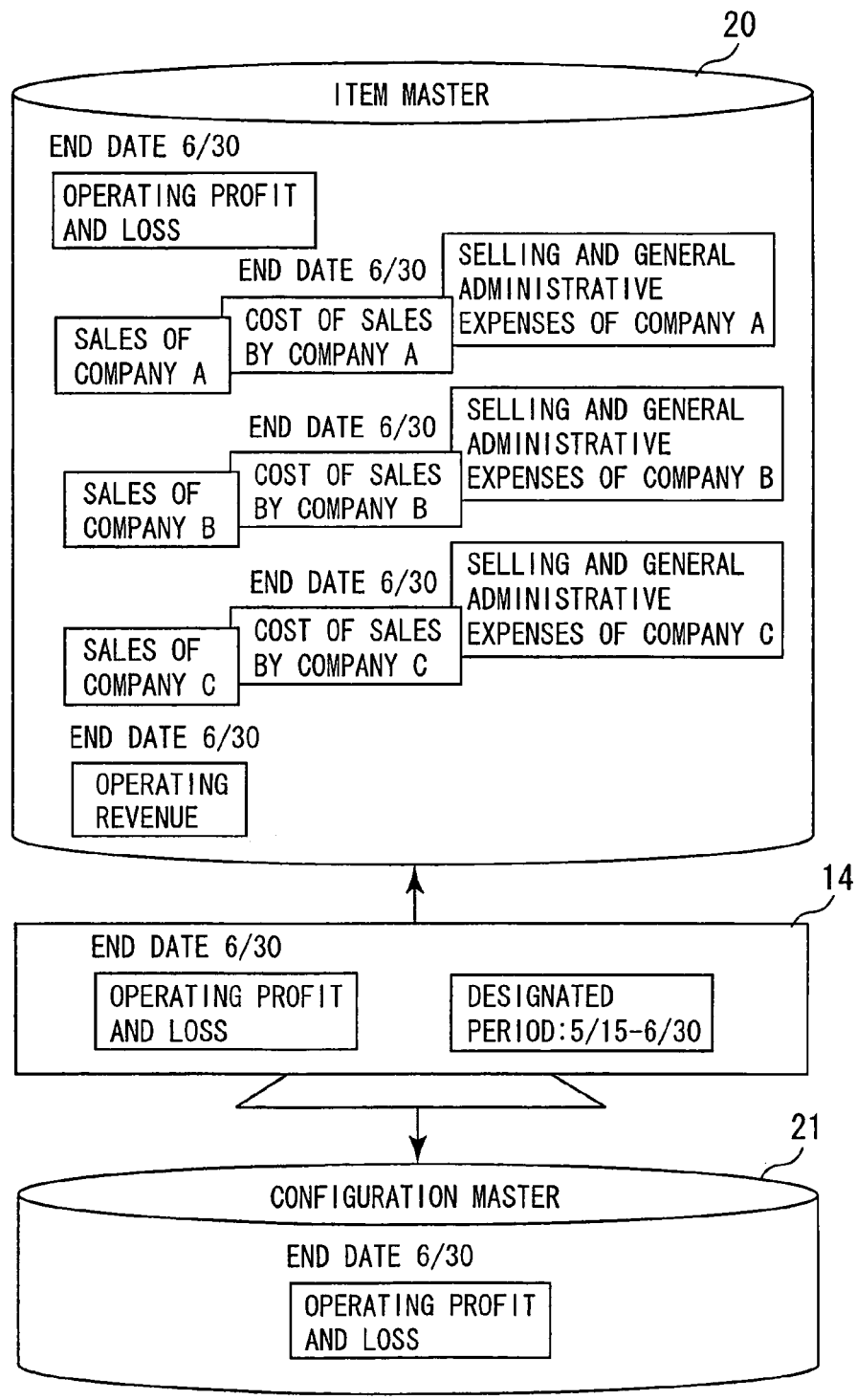
FIG. 11 is a schematic diagram for the masters, which corresponds to FIG. 10.

FIG. 10 is a diagram illustrating another example of the accounting database as of the close date, and FIG. 11 is a schematic diagram in which the masters 20 and 21 have some account item elements and consolidated relationships memorized therein. FIG. 11 corresponds to FIG. 10. FIG. 10 shows the accounting database generated after entry of a designated period (May 15 to June 30). In this accounting database, the sales of company A, the cost of sales by company A, and the selling and general administrative expenses of company A, which are account item elements as of April 1, xx, have been deselected from the accounting database upon entry of the designated period (May 15 to June 30), the operating profit and loss, the sales of company B, the sales of company C, the sale total, the cost of sales by company B, the cost of sales by company C, the total cost of sales, the selling and general administrative expenses of company B, the selling and general administrative expenses of company C, the total selling and general administrative expenses, the operating revenue, and their values are account item elements, and the sales of company B, the sales of company C, the sale total, the cost of sales by company B, the cost of sales by company C, the total cost of sales, the selling and general administrative expenses of company B, the selling and general administrative expenses of company C, the total selling and general administrative expenses, and the operating revenue are linked to the operating profit and loss to form a hierarchical structure. In the designated period, the sale total is (¥850,000), the total cost of sales is (¥760,000), and the total selling and general administrative expenses are (¥850,000). The operating revenue in the designated period is equivalent to a value (¥240,000) obtained by subtracting the total cost of sales and the total selling and general administrative expenses from the sale total. In the system 10, the operating profit and loss is invoked, the designated period is entered to the time entry area. When the designated period is entered, and an accounting database preparation request is inputted, the system 10 refers to time data for the designated period entered in the time entry area, and extracts account item elements for the designated period, thereby generating the accounting database in real time (database generation means). The system 10 automatically calculates the sale total, the total cost of sales, the total selling and general administrative expenses, and the operating revenue in accordance with the predetermined calculation formulae. When an accounting database output request is inputted, the system 10 outputs, in real time, the accounting database generated based on the account item elements present in the designated period (database output means).

Figure 13:
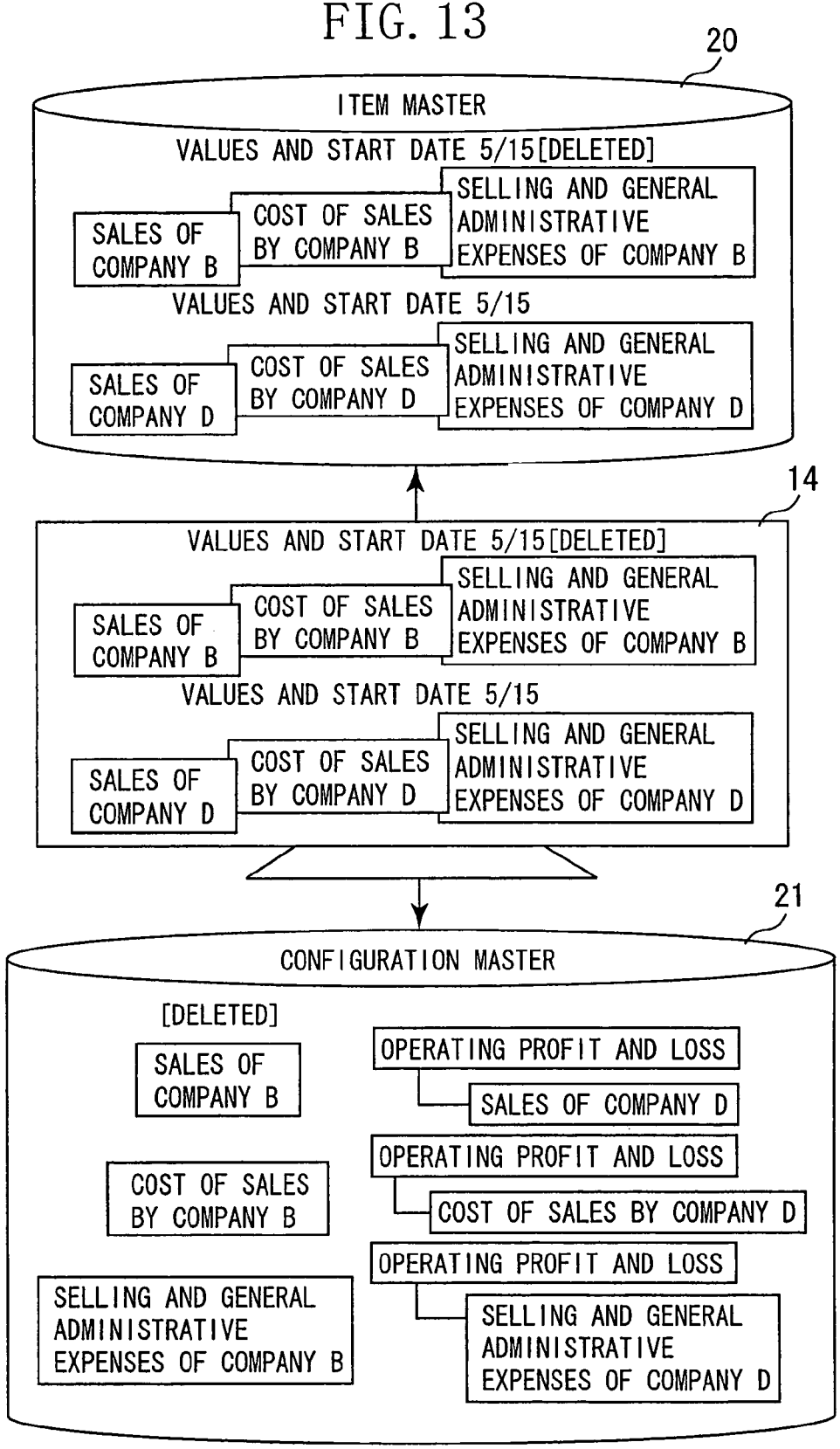
FIG. 13 is a schematic diagram for the masters, which corresponds to FIG. 12.
Figure 14:
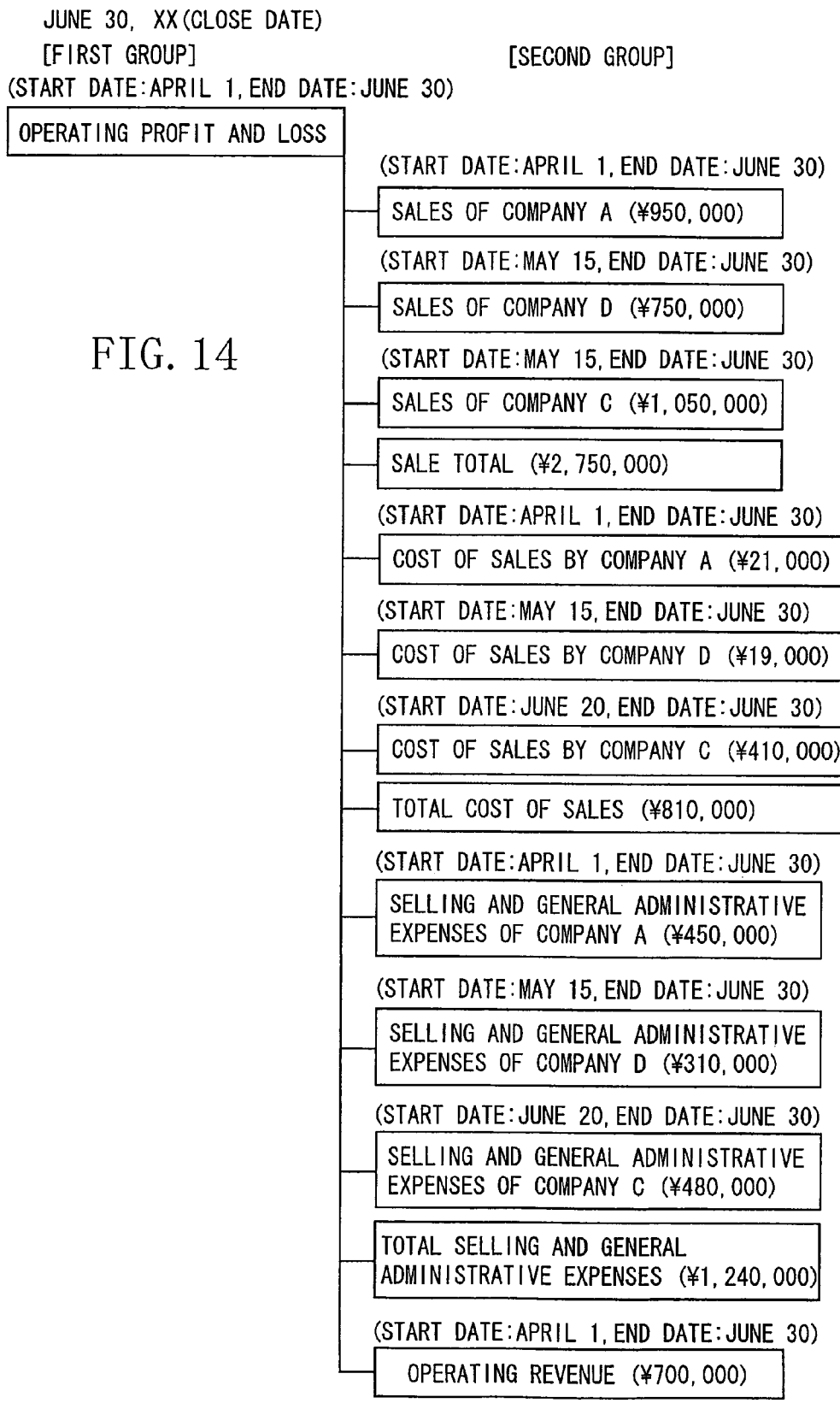
FIG. 14 is a diagram of the hierarchically-structured accounting database as of June 30, xx where account item elements are modified.

FIG. 12 is a diagram illustrating an example of the accounting database as of May 15 with account item elements having been changed (modified) retroactively from June 30, xx to May 15, xx, and FIG. 13 is a schematic diagram in which the masters 20 and 21 have some account item elements and consolidated relationships memorized therein. FIG. 14 is a diagram illustrating an example of the accounting database as of the close date with the account item elements having been changed (modified). FIG. 13 corresponds to FIG. 12. On June 30, xx, as shown in FIG. 12, of all account item elements forming the accounting database as of May 15, xx, the sales of company B is changed to sales of company D, the cost of sales by company B is changed to cost of sales by company D, the selling and general administrative expenses of company B is changed to selling and general administrative expenses of company D, and the values for company B are changed to those for company D (account item modification means).

In the accounting database shown in FIG. 12, the operating profit and loss, the sales of company A, the sales of company D, the cost of sales by company A, the cost of sales by company D, the selling and general administrative expenses of company A, the selling and general administrative expenses of company D, the operating revenue, and their values are account item elements, the sales of company A, the sales of company D, the cost of sales by company A, the cost of sales by company D, the selling and general administrative expenses of company A, the selling and general administrative expenses of company D, and the operating revenue are linked to the operating profit and loss to form a hierarchical structure. The sales of company D, the cost of sales by company D, and the selling and general administrative expenses of company D belong to the second group for the concepts at the level immediately below the operating profit and loss. As of May 15, xx, the value of sales of company D is (¥750,000), the value of the cost of sales by company D is (¥190,000), and the value of the selling and general administrative expenses of company D is (¥310,000). The operating revenue as of May 15, xx is equivalent to a value (¥580,000) obtained by subtracting the costs of sales by companies A and D and the selling and general administrative expenses of companies A and D from the sale total obtained by adding up the sales of company A and the sales of company D. For the sales of company D, the cost of sales by company D, and the selling and general administrative expenses of company D, the start date May 15 (start indicator) that indicates the time of integration into the accounting database is set.

In the system 10, May 15 is entered to the time entry area, the sales of company B, the cost of sales by company B, and the selling and general administrative expenses of company B are displayed in the item entry area as of May 15 as shown in FIG. 13, the sales of company B, the cost of sales by company B, and the selling and general administrative expenses of company B are changed to the sales of company D, the cost of sales by company D, and the selling and general administrative expenses of company D in the item entry area, and the values for company B are displayed in the value entry area as of May 15, and changed to those for company D in the value entry area. Furthermore, the consolidated relationships of the sales of company D, the cost of sales by company D, and the selling and general administrative expenses of company D with respect to the operating profit and loss are entered to the consolidated relationship entry area, and May 15 is entered to the start indicator entry area. The central processing unit 18 sets the start date May 15 (start indicator) for the sales of company D, the cost of sales by company D, and the selling and general administrative expenses of company D, erases the sales of company B, the cost of sales by company B, the selling and general administrative expenses of company B, their values, and the consolidated relationships from the master 20, 21, and outputs the sales of company D, the cost of sales by company D, the selling and general administrative expenses of company D, their values, and the consolidated relationships to the auxiliary memory device 13, thereby memorizing them to the master 20, 21. In accordance with an instruction from the central processing unit 18, the auxiliary memory device 13 erases the sales of company B, the cost of sales by company B, the selling and general administrative expenses of company B, their values, and the consolidated relationships from the master 20, 21, and stores the sales of company D, the cost of sales by company D, and the selling and general administrative expenses of company D, for which the start indicator has been set, along with their values and consolidated relationships, to the records memorized in the master 20, 21, retroactively to May 15 (the time of changing) (data memory means). By changing the account items and the values retroactively to May 15, the changed account items, along with their values and consolidated relationships, are incorporated into the records memorized in the master 20, 21 as of June 30, xx, and also into the memorized records as of June 20, xx, thereby updating the memorized records as of May 15, xx, June 20, xx, and June 30, xx (automatic modification means). After the account item elements are changed, the master 20 as of June 30, xx has memorized therein the sales of company A, the sales of company D, the sales of company C, the cost of sales by company A, the cost of sales by company D, the cost of sales by company C, the selling and general administrative expenses of company A, the selling and general administrative expenses of company D, the selling and general administrative expenses of company C, and operating revenue, for which the end indicator has been set (database memory means). The account item elements and consolidated relationships as of April 1, xx are maintained in the master 20, 21, as memorized records.

In the accounting database as of the close date (June 30) shown in FIG. 14, the operating profit and loss, the sales of company A, the sales of company D, the sales of company C, the sale total, the cost of sales by company A, the cost of sales by company D, the cost of sales by company C, the total cost of sales, the selling and general administrative expenses of company A, the selling and general administrative expenses of company D, the selling and general administrative expenses of company C, the total selling and general administrative expenses, the operating revenue, and their values have become account item elements to accord with the changing of the account items and values on May 15, and the sales of company A, the sales of company D, the sales of company C, the sale total, the cost of sales by company A, the cost of sales by company D, the cost of sales by company C, the total cost of sales, the selling and general administrative expenses of company A, the selling and general administrative expenses of company D, the selling and general administrative expenses of company C, the total selling and general administrative expenses, and the operating revenue are linked to the operating profit and loss to form a hierarchical structure. As of June 30, xx, the sale total is (¥2,750,000), the total cost of sales is (¥810,000), and the total selling and general administrative expenses are (¥1,240,000). The operating revenue as of June 30, xx is equivalent to a value (¥700,000) obtained by subtracting the total cost of sales and the total selling and general administrative expenses from the sale total.

For the sales of company A, the sales of company D, the sales of company C, the sale total, the cost of sales by company A, the cost of sales by company D, the cost of sales by company C, the total cost of sales, the selling and general administrative expenses of company A, the selling and general administrative expenses of company D, the selling and general administrative expenses of company C, the total selling and general administrative expenses, and the operating revenue, the end date June 30 (end indicator) that indicates the time of exclusion from the accounting database is set. After May 15, xx is entered to the time entry area, when an accounting database preparation request is inputted, the system 10 automatically generates an accounting database as of May 15, xx, with account item elements being modified; after the end date June 30, xx is entered to the close date entry area, when an accounting database preparation request is inputted on June 30, xx, the system 10 automatically generates an accounting database as of the close date, with account item elements being modified (database generation means). In the system 10, it is also possible to memorize the accounting databases as of May 15, xx, June 20, xx, and June 30, xx, with the account item elements being changed, to the main memory device 19 and the auxiliary memory device 13. When an accounting database output request is inputted, the system 10 outputs the generated accounting database in FIG. 12 or 14 via a liquid crystal display, a CRT, or a printer (database output means).

Figure 15:
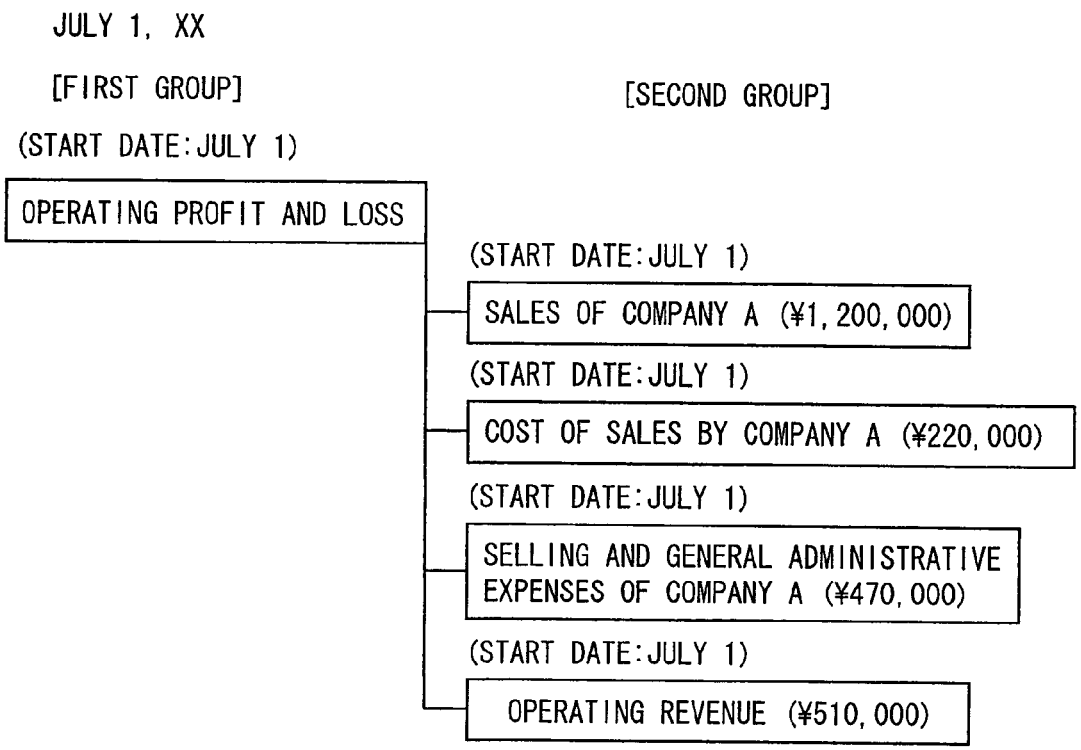
FIG. 15 is a diagram of a hierarchically-structured accounting database as of July 1, xx.
Figure 16:
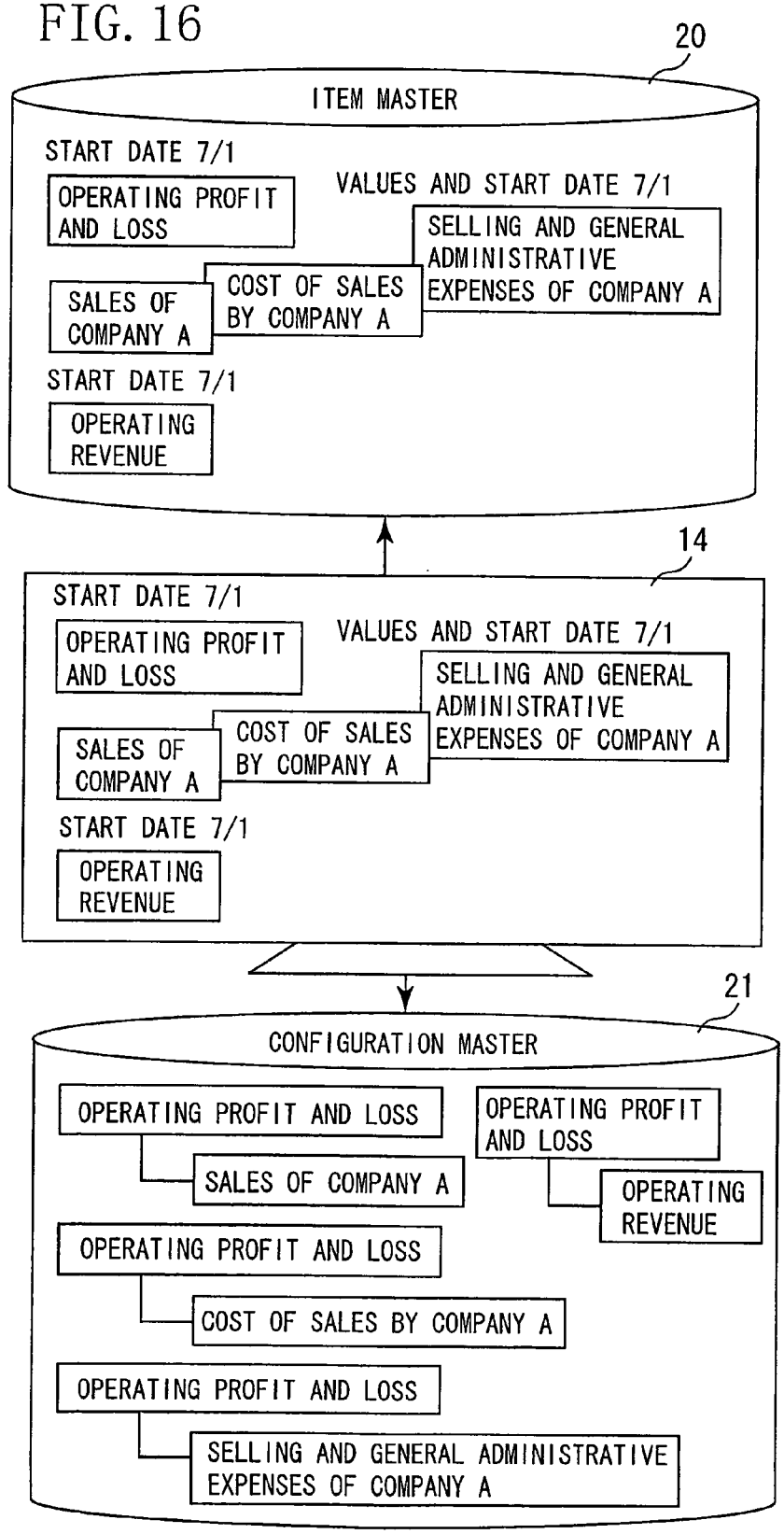
FIG. 16 is a schematic diagram for the masters, which corresponds to FIG. 15.
Figure 18:
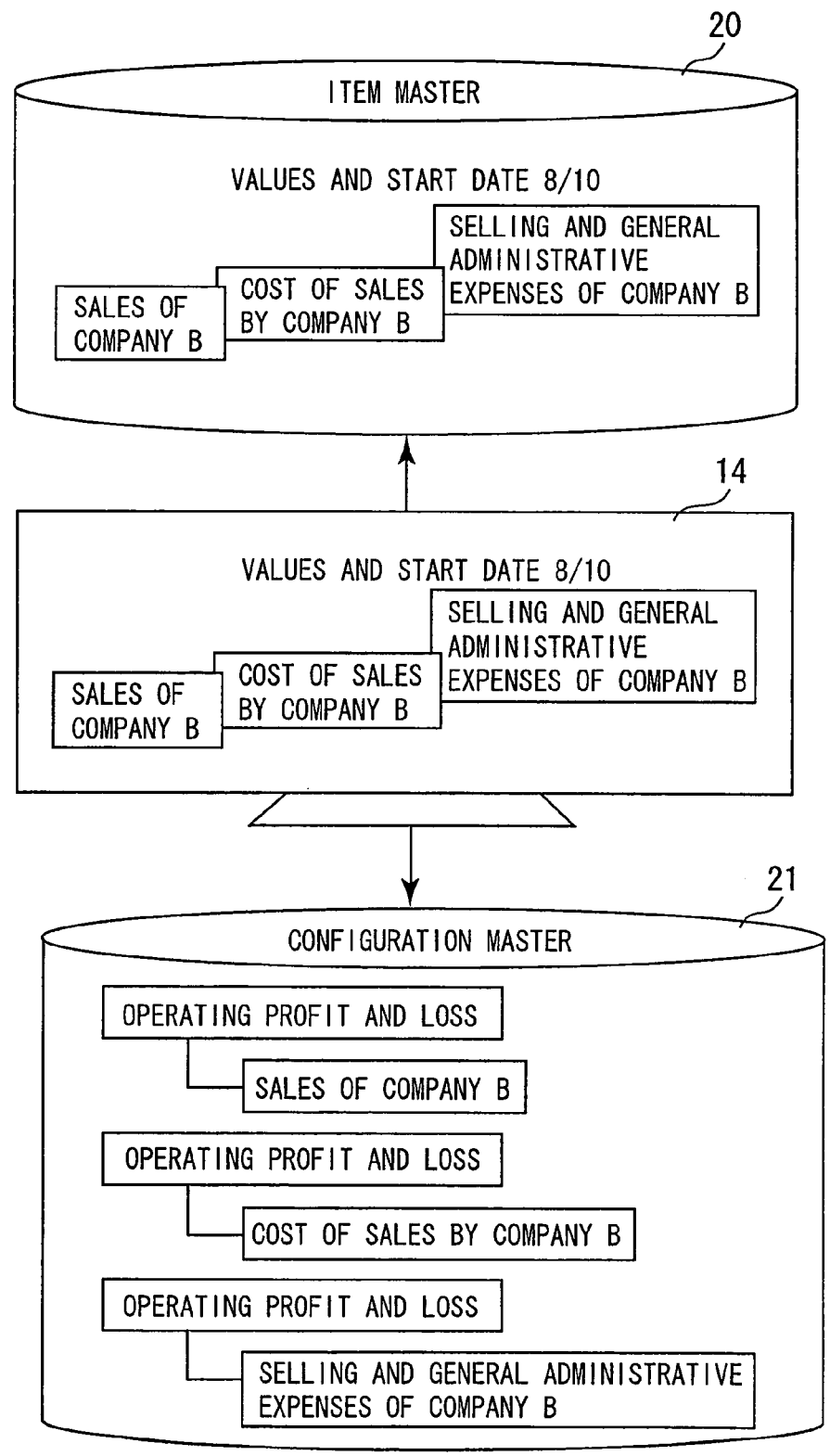
FIG. 18 is a schematic diagram for the masters, which corresponds to FIG. 17.

FIG. 15 is a diagram illustrating an example of the accounting database as of July 1, xx, and FIG. 17 is a diagram illustrating an example of the accounting database as of August 10, xx. FIGS. 16 and 18 are schematic diagrams in which the masters 20 and 21 have some account item elements and consolidated relationships memorized therein. FIG. 16 corresponds to FIG. 15, and FIG. 18 corresponds to FIG. 17. The accounting databases in FIGS. 15 and 17 are databases generated anew on or after the close date (June 30, xx).

In the accounting database shown in FIG. 15, the operating profit and loss, the sales of company A, the cost of sales by company A, the selling and general administrative expenses of company A, the operating revenue, and their values are account item elements, and the sales of company A, the cost of sales by company A, the selling and general administrative expenses of company A, and the operating revenue are linked to the operating profit and loss to form a hierarchical structure. The operating profit and loss is an account item element in the first group, and the sales of company A, the cost of sales by company A, the selling and general administrative expenses of company A, and the operating revenue belong to the second group for the concepts at the level immediately below the operating profit and loss. As of July 1, xx, the value of the sales of company A is (¥200,000), the value of the cost of sales by company A is (¥220,000), and the value of the selling and general administrative expenses of company A is (¥470,000). The operating revenue as of July 1, xx is equivalent to a value (¥510,000) obtained by subtracting the cost of sales by company A and the selling and general administrative expenses of company A from the sales of company A. For the operating profit and loss, the sales of company A, the cost of sales by company A, the selling and general administrative expenses of company A, and the operating revenue, the start date July 1 (start indicator) that indicates the time of integration into the accounting database is set.

In the system 10, as shown in FIG. 16, the operating profit and loss, the sales of company A, the cost of sales by company A, the selling and general administrative expenses of company A, and the operating revenue are entered to the item entry area by means of the input device 14, and their values and start date July 1 (start indicator) are respectively entered to the value entry area and the start indicator entry area by means of the input device 14. For the operating profit and loss, the sales of company A, the cost of sales by company A, the selling and general administrative expenses of company A, and the operating revenue, the start date July 1 is set by the central processing unit 18. The operating profit and loss, the sales of company A, the cost of sales by company A, the selling and general administrative expenses of company A, the operating revenue, and their values are transferred from the central processing unit 18 to the auxiliary memory device 13, and stored to the item master 20 (data memory means).

Next, systematic consolidated relationships of the sales of company A, the cost of sales by company A, the selling and general administrative expenses of company A, and the operating revenue with respect to the operating profit and loss are entered to the consolidated relationship entry area by means of the input device 14. The consolidated relationships of the sales of company A, the cost of sales by company A, the selling and general administrative expenses of company A, and the operating revenue with respect to the operating profit and loss are transferred from the central processing unit 18 to the auxiliary memory device 13, and stored to the configuration master 21 (data memory means). Once the consolidated relationships are inputted, the operating profit and loss and the sales of company A are correlated to each other, and the operating profit and loss and the cost of sales by company A are correlated to each other. Furthermore, the operating profit and loss and the selling and general administrative expenses of company A are correlated to each other, and the operating profit and loss and the operating revenue are correlated to each other. As a result, it becomes apparent that: the sales of company A, the cost of sales by company A, the selling and general administrative expenses of company A, and the operating revenue are present as the concepts at the level immediately below the operating profit and loss; the operating profit and loss is formed by the sales of company A, the cost of sales by company A, the selling and general administrative expenses of company A, and the operating revenue; and the operating revenue is equivalent to a value obtained by subtracting the cost of sales by company A and the selling and general administrative expenses of company A from the sales of company A.

After the operating profit and loss, the sales of company A, the cost of sales by company A, the selling and general administrative expenses of company A, the operating revenue, the values, and the consolidated relationships are stored to the master 20, 21, when July 1, xx is entered to the time entry area, and an accounting database preparation request is inputted, the system 10 automatically generates the accounting database as of July 1, xx in FIG. 15 (accounting database generation means). The system 10 automatically calculates the operating revenue. The system 10 memorizes the generated accounting database as of July 1, xx to the main memory device 19 or the auxiliary memory device 13. When an accounting database output request is inputted, the system 10 outputs the generated accounting database as of July 1, xx via a liquid crystal display, a CRT, or a printer (accounting database output means). In the system 10, the accounting database as of July 1, xx can be generated in real time at any time on or after July 1, xx (database generation means), and the generated accounting database as of July 1, xx can be outputted in real time at any time (database output means). Also, in the system 10, not only the accounting database as of July 1, xx but also the accounting databases as of April 1, xx, May 15, xx, June 20, xx, and June 30, xx can be generated in real time at any time on or after July 1, xx (database memory means), and the generated accounting databases as of April 1, xx, May 15, xx, June 20, xx, and June 30, xx can be outputted in real time at any time on or after July 1, xx (database output means).

When compared to the accounting database as of July 1, xx, the accounting database as of August 10, xx, as shown in FIG. 17, additionally contains the sales of company B, the cost of sales by company B, the selling and general administrative expenses of company B, and their values (account item modification means). In the accounting database shown in FIG. 17, the operating profit and loss, the sales of company A, the sales of company B, the cost of sales by company A, the cost of sales by company B, the selling and general administrative expenses of company A, the selling and general administrative expenses of company B, the operating revenue, and their values are account item elements, and the sales of company A, the sales of company B, the cost of sales by company A, the cost of sales by company B, the selling and general administrative expenses of company A, the selling and general administrative expenses of company B, and the operating revenue are linked to the operating profit and loss to form a hierarchical structure. The sales of company B, the cost of sales by company B, and the selling and general administrative expenses of company B belong to the second group for the concepts at the level immediately below the operating profit and loss. As of August 10, xx, the value of the sales of company B is (¥950,000), the value of the cost of sales by company B is (¥360,000), and the value of the selling and general administrative expenses of company B is (¥340,000). The operating revenue as of August 10, xx is equivalent to a value (¥760,000) obtained by subtracting the costs of sales by companies A and B, and the selling and general administrative expenses of companies A and B from the sale total obtained by adding up the sales of company A and the sales of company B. For the sales of company B, the cost of sales by company B, the selling and general administrative expenses of company B, the start date August 10 (start indicator) that indicates the time of integration into the accounting database is set.

In the system 10, as shown in FIG. 18, the sales of company B, the cost of sales by company B, and the selling and general administrative expenses of company B are entered to the item entry area by means of the input device 14, and their values and start date August 10 (start indicator) are respectively entered to the value entry area and the start indicator entry area by means of the input device 14. For the sales of company B, the cost of sales by company B, and the selling and general administrative expenses of company B, the start date August 10 is set by the central processing unit 18. The sales of company B, the cost of sales by company B, the selling and general administrative expenses of company B, and their values are transferred from the central processing unit 18 to the auxiliary memory device 13, and stored to the item master 20 (data memory means).

Next, systematic consolidated relationships of the sales of company B, the cost of sales by company B, and the selling and general administrative expenses of company B with respect to the operating profit and loss are entered to the consolidated relationship entry area by means of the input device 14. The consolidated relationships of the sales of company B, the cost of sales by company B, and the selling and general administrative expenses of company B with respect to the operating profit and loss are transferred from the central processing unit 18 to the auxiliary memory device 13, and stored to the configuration master 21 (data memory means). When the consolidated relationships are entered, the operating profit and loss and the sales of company B are correlated to each other, the operating profit and loss and the cost of sales by company B are correlated to each other, and the operating profit and loss and the selling and general administrative expenses of company B are correlated to each other. As a result, it becomes apparent that: the sales of company B, the cost of sales by company B, and the selling and general administrative expenses of company B are present as the concepts at the level immediately below the operating profit and loss, the operating profit and loss is formed by the sales of company A, the sales of company B, the cost of sales by company A, the cost of sales by company B, the selling and general administrative expenses of company A, the selling and general administrative expenses of company B, and the operating revenue; and the operating revenue is equivalent to a value obtained by subtracting the cost of sales by companies A and B and the selling and general administrative expenses of companies A and B from the total of the sales of company A and the sales of company B.

After the sales of company B, the cost of sales by company B, and the selling and general administrative expenses of company B, along with their values and consolidated relationships, are stored to the master 20,21, when August 10, xx is entered to the time entry area, and an accounting database preparation request is inputted, the system 10 automatically generates the accounting database as of August 10, xx in FIG. 17 (database generation means). The system 10 automatically calculates the operating revenue. The system 10 updates the memorized records as of July 1, xx on August 10, xx. The account item elements and consolidated relationships as of July 1, xx are maintained in the master 20,21, as memorized records. Note that after the updating on August 10, xx, the master 20, 21, has memorized therein only the sales of company B, the cost of sales by company B, the selling and general administrative expenses of company B, their values, and the consolidated relationships for company B with the operating profit and loss. That is, only portions of the accounting database shown in FIG. 17 that are different from the accounting database in FIG. 15 are memorized in the master 20, 21. In addition, the sales of company A, the sales of company B, the cost of sales by company A, the cost of sales by company B, the selling and general administrative expenses of company A, and the selling and general administrative expenses of company B, for which the start date (start indicator) has been set, are contained in the accounting database from the present onward, unless the end date (end indicator) is set for them.

In the system 10, the generated accounting database as of August 10, xx can also be memorized in the main memory device 19 or the auxiliary memory device 13. When an accounting database output request is inputted, the system 10 outputs the generated accounting database as of August 10, xx via a liquid crystal display, a CRT, or a printer (database output means). Also, in the system 10, not only the accounting database as of August 10, xx but also the accounting databases as of April 1, xx, May 15, xx, June 20, xx, June 30, xx, and July 1, xx can be generated in real time at any time on or after August 10, xx (database generation means), and the generated accounting databases as of April 1, xx, May 15, xx, June 20, xx, June 30, xx, and July 1, xx can be outputted in real time at any time on or after August 10, xx (database output means).

Figure 20:
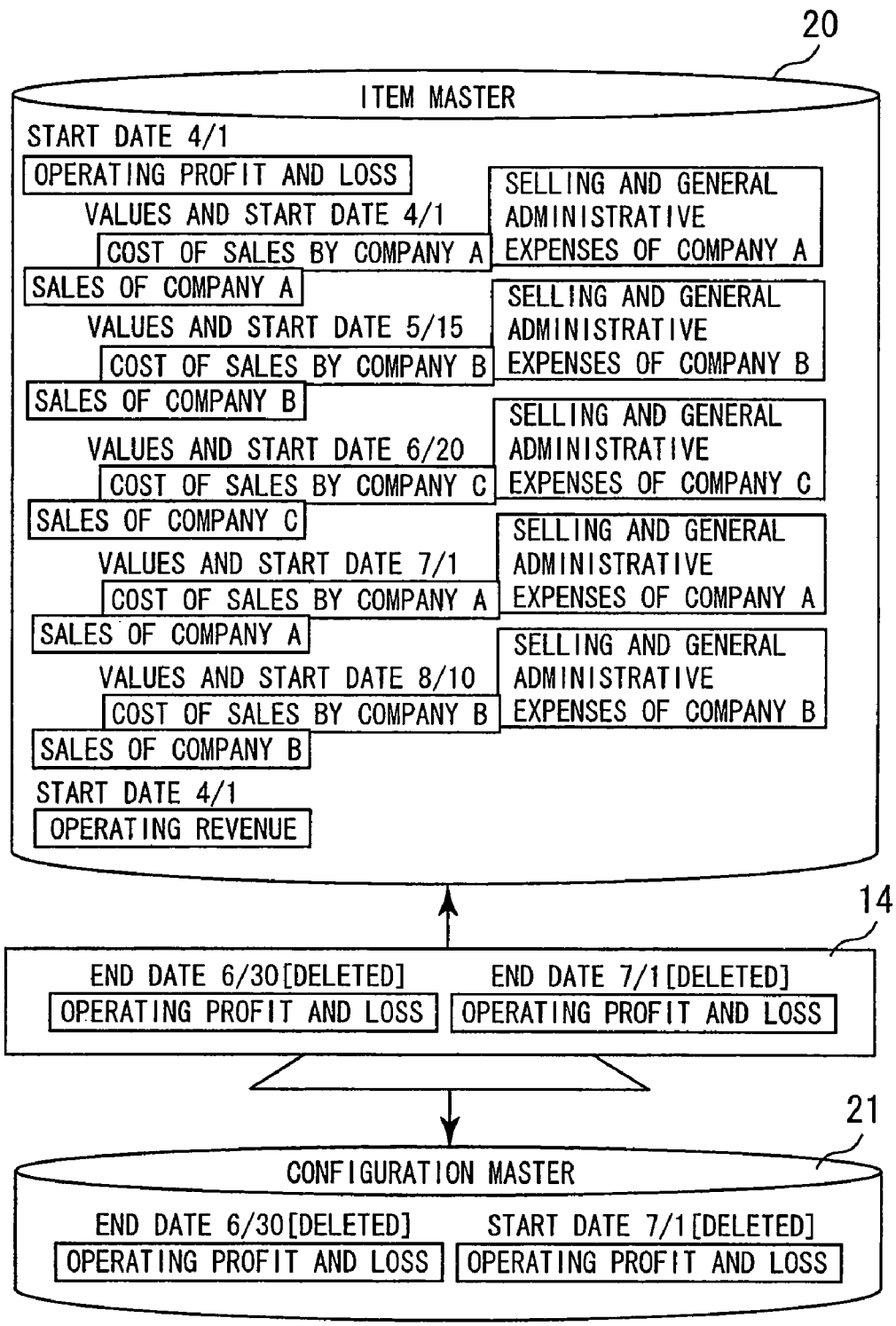
FIG. 20 is a schematic diagram for the masters, which corresponds to FIG. 19.

FIG. 19 is a diagram illustrating an example of the accounting database as of August 15. FIG. 20 is a schematic diagram in which the masters 20 and 21 have some account item elements and consolidated relationships memorized therein. FIG. 20 corresponds to FIG. 19. This accounting database is a database generated after the end date (close date June 30) and the start date (July 1) in the operating profit and loss are deleted. In the system 10, the end date and the start date can be retroactively deleted, and when the end date (June 30) and the start date (July 1) in the operating profit and loss are deleted, the account item elements that have been present from April 1, xx to August 15, xx are still contained in the accounting database.

In the accounting database shown in FIG. 19, the operating profit and loss, the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, the operating revenue, and their values are account item elements, and the sales of company A, the sales of company B, the sales of company C, the sale total, the cost of sales by company A, the cost of sales by company B, the cost of sales by company C, the total cost of sales, the selling and general administrative expenses of company A, the selling and general administrative expenses of company B, the selling and general administrative expenses of company C, the total selling and general administrative expenses, and the operating revenue are linked to the operating profit and loss to form a hierarchical structure. The operating revenue as of August 15, xx is equivalent to a value (¥1,290,000) obtained by subtracting the total cost of sales, and the total selling and general administrative expenses from the sale total. For the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, and the operating revenue, the start date April 1, May 15, June 20, July 1, or August 10 (start indicator) is set.

In the system 10, once the end date and the start date in the operating profit and loss are deleted, the operating profit and loss is correlated to the sales of company A (start date April 1), the sales of company A (start date July 1), the sales of company B (start date May 15), the sales of company B (start date August 10), and the sales of company C (start date June 20), and the operating profit and loss is also correlated to the cost of sales by company A (start date April 1), the cost of sales by company A (start date July 1), the cost of sales by company B (start date May 15), the cost of sales by company B (start date August 10), and the cost of sales by company C (start date June 20). Furthermore, the operating profit and loss is correlated to the selling and general administrative expenses of company A (start date April 1), the selling and general administrative expenses of company A (start date July 1), the selling and general administrative expenses of company B (start date May 15), the selling and general administrative expenses of company B (start date August 10), and the selling and general administrative expenses of company C (start date June 20), and the operating profit and loss is also correlated to the operating revenue (start date April 1). As a result, it becomes apparent that: the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, and the operating revenue are present as the concepts at the level immediately below the operating profit and loss; the operating profit and loss is formed by the sales of company A, the sales of company B, the sales of company C, the cost of sales by company A, the cost of sales by company B, the cost of sales by company C, the selling and general administrative expenses of company A, the selling and general administrative expenses of company B, the selling and general administrative expenses of company C, and the operating revenue; and the operating revenue is equivalent to a value obtained by subtracting the costs of sales by companies A, B, and C, and the selling and general administrative expenses of companies A, B, and C from the sale total obtained by adding up the sales of company A, the sales of company B, and the sales of company C.

After the end date and the start date in the operating profit and loss are deleted, when August 15, xx is entered to the time entry area, and an accounting database preparation request is inputted, the system 10 generates the accounting database as of August 15, xx in FIG. 19 (database generation means). In the system 10, the generated accounting database as of August 15, xx can also be memorized to the main memory device 19 or the auxiliary memory device 13. When an accounting database output request is inputted, the system 10 outputs the generated accounting database as of August 15, xx via a liquid crystal display, a CRT, or a printer (database output means). Note that in the system 10, the end date (June 30, xx) and the start date (July 1, xx) can be set for the operating profit and loss again, retroactively to June 30, xx.

In the system 10, account item elements chronologically memorized in the master 20 are used with the classifications from the first to n'th groups, and the account item elements are aggregated in accordance with accounting principles, thereby constructing a plurality of hierarchically-structured accounting databases as of different points, either in the past or both in the past and present. In the system, hierarchically-structured accounting databases as of any given time points can be generated and outputted by the database generation means and the database output means, and therefore it is possible to weigh, as necessary, hierarchically-structured accounting databases or account item elements as of different points in time. The system 10 makes it possible to clarify systematic connections between the account item elements based on the generated hierarchically-structured accounting databases, and thereby to carry out suitable accounting analysis based on the hierarchically-structured accounting databases and the account item elements.

In the system 10, a hierarchically-structured accounting database can be generated and outputted in real time with at least one of the classifications from the first to n'th groups, and therefore by generating and outputting an individual hierarchically-structured accounting database with any necessary group(s) from among the first to n'th groups, it becomes possible to clarify, for each group, relative connections between the account item elements, and thereby to carry out suitable and reliable accounting analysis based on the hierarchically-structured accounting database and the account item elements.

In the system 10, when a given period in the past or up to the present is designated, account item elements present in the designated period are used, and aggregated in accordance with accounting principles, so that a hierarchically-structured accounting database, in which the account item elements present in the designated period are systematically related, can be generated and outputted in real time, thereby making it possible to carry out accounting analysis for the designated period based on the hierarchically-structured accounting database.

In the system 10, the start indicator is set per account item element to indicate a point at which the account item element has been integrated into a hierarchically-structured accounting database, and the end indicator is set per account item element to indicate a point at which the account item element has been excluded from the hierarchically-structured accounting database, so that points at which the account item element has been integrated into and excluded from the hierarchically-structured accounting database are clarified, making it possible to identify a period during which a given account item element has been contained in the hierarchically-structured accounting database, and thereby to reliably manage hierarchically-structured accounting databases and account item elements chronologically from the past to the present by using the start indicator and the end indicator.

In the system 10, account item elements as of any given point in the past or at the present can be freely modified, and therefore it is possible to construct a hierarchically-structured accounting database as of any given point in the past or at the present based on the modified account item elements. When an account item element is retroactively modified, this system 10 automatically modifies account item elements that have been present since the modification time of the account item element up to the present and are to be modified to accord with the modified account item element, and therefore the necessity of individually modifying all account item elements from the modification of the account item element up to the present can be avoided, making it possible to prevent an error from occurring due to individual modification of all the account item elements, as well as to prevent the procedure from becoming complicated.

When an account item element that belongs to a high-level concept is modified currently or retroactively, the system 10 automatically erases other account item elements within lower-level concepts that have been present since the modification of the account item element up to the present and are to be modified to accord with the modified account item element, so that the account item elements within the lower-level concepts that are to be modified to accord with the modified account item element within the high-level concept do not remain in the system 10, and the account item elements within the lower-level concepts that are to be modified to accord with the modified account item element within the high-level concept are not contained in the hierarchically-structured accounting database, and therefore it is possible to prevent an erroneous hierarchically-structured accounting database from being generated during a period from the modification of the account item up to the present. In the system 10, even if any account item element that is to be memorized therein is missing, it is possible to freely add that missing account item element; even if any erroneous account item element is present at a point in the past, it can be changed to a correct account item element; and furthermore, even if any unnecessary account item element is memorized in the system, it is possible to retroactively delete that unnecessary account item element.

Figure 21:
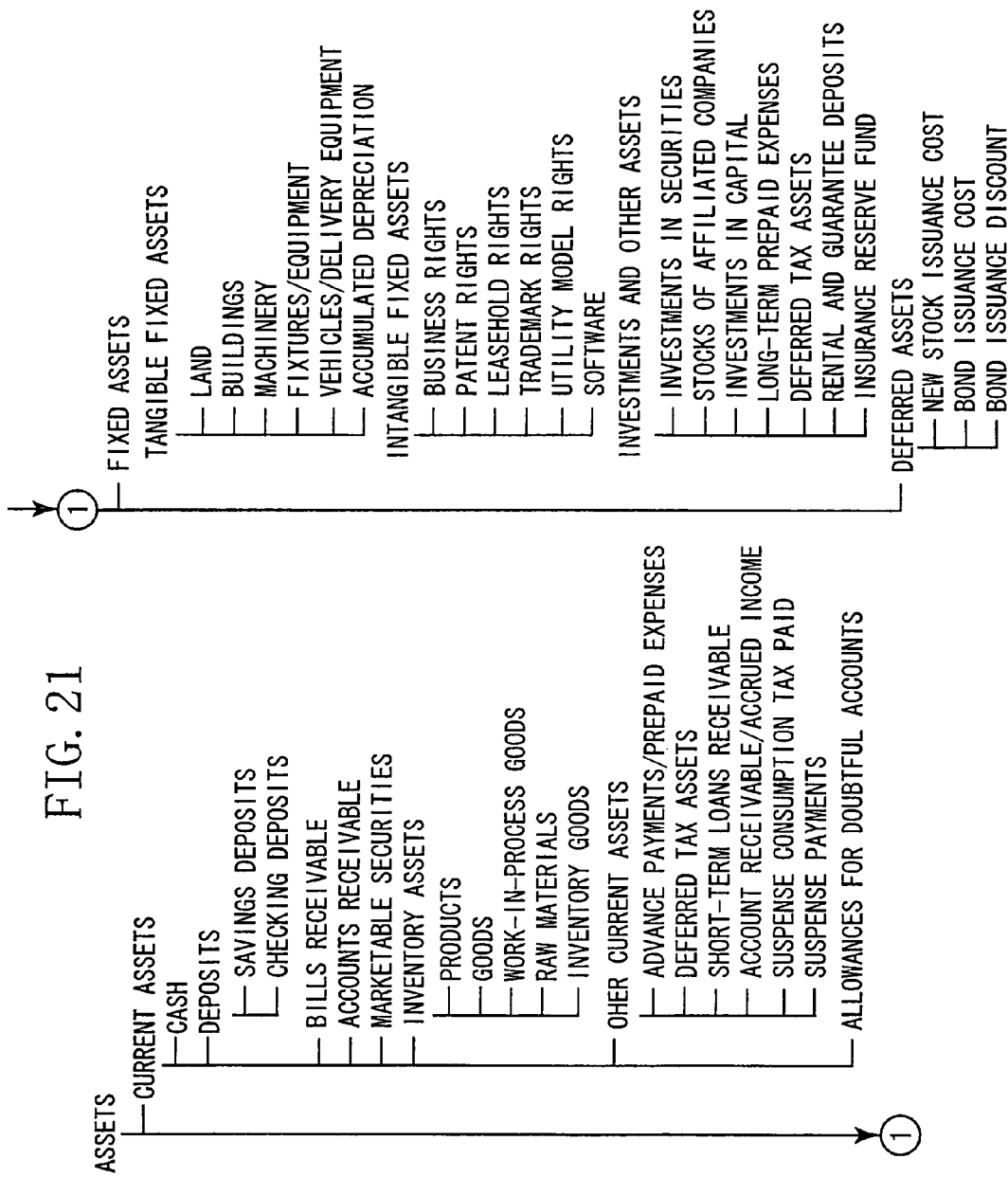
FIG. 21 is a diagram of an exemplary hierarchically-structured accounting database for a general ledger.
Figure 22:
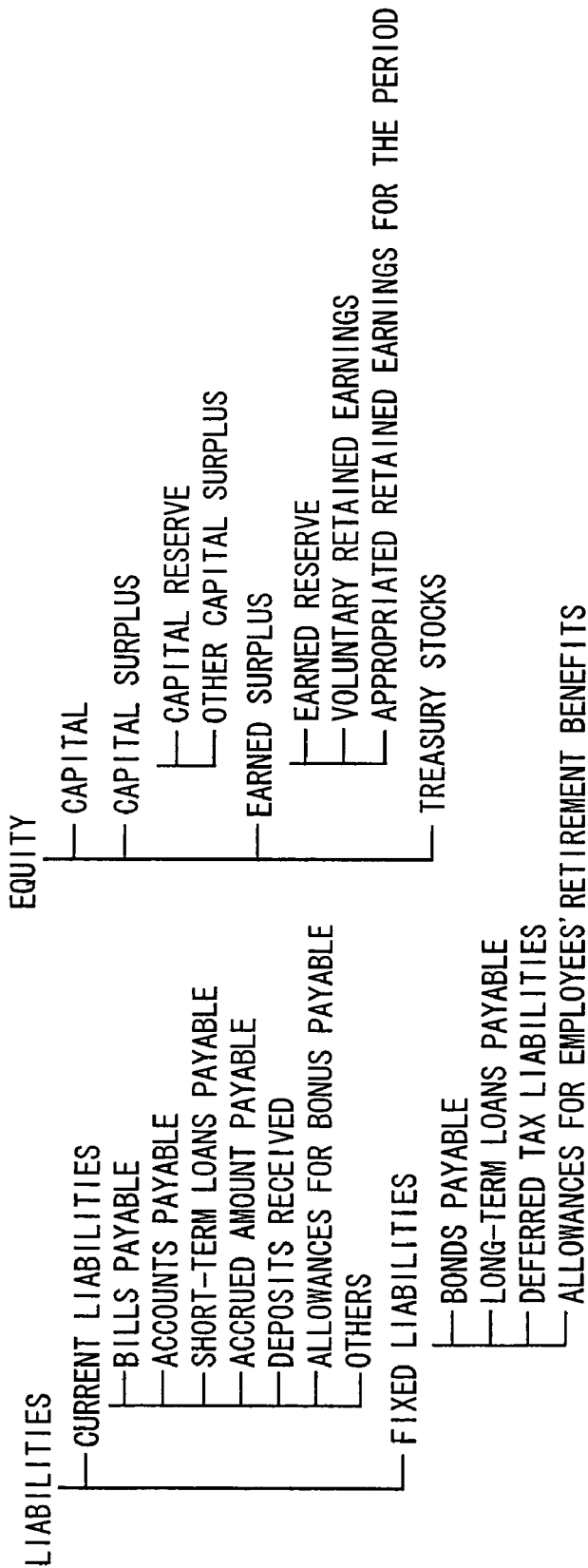
FIG. 22 is a diagram of the hierarchically-structured accounting database for the general ledger continued from FIG. 21.
Figure 23:
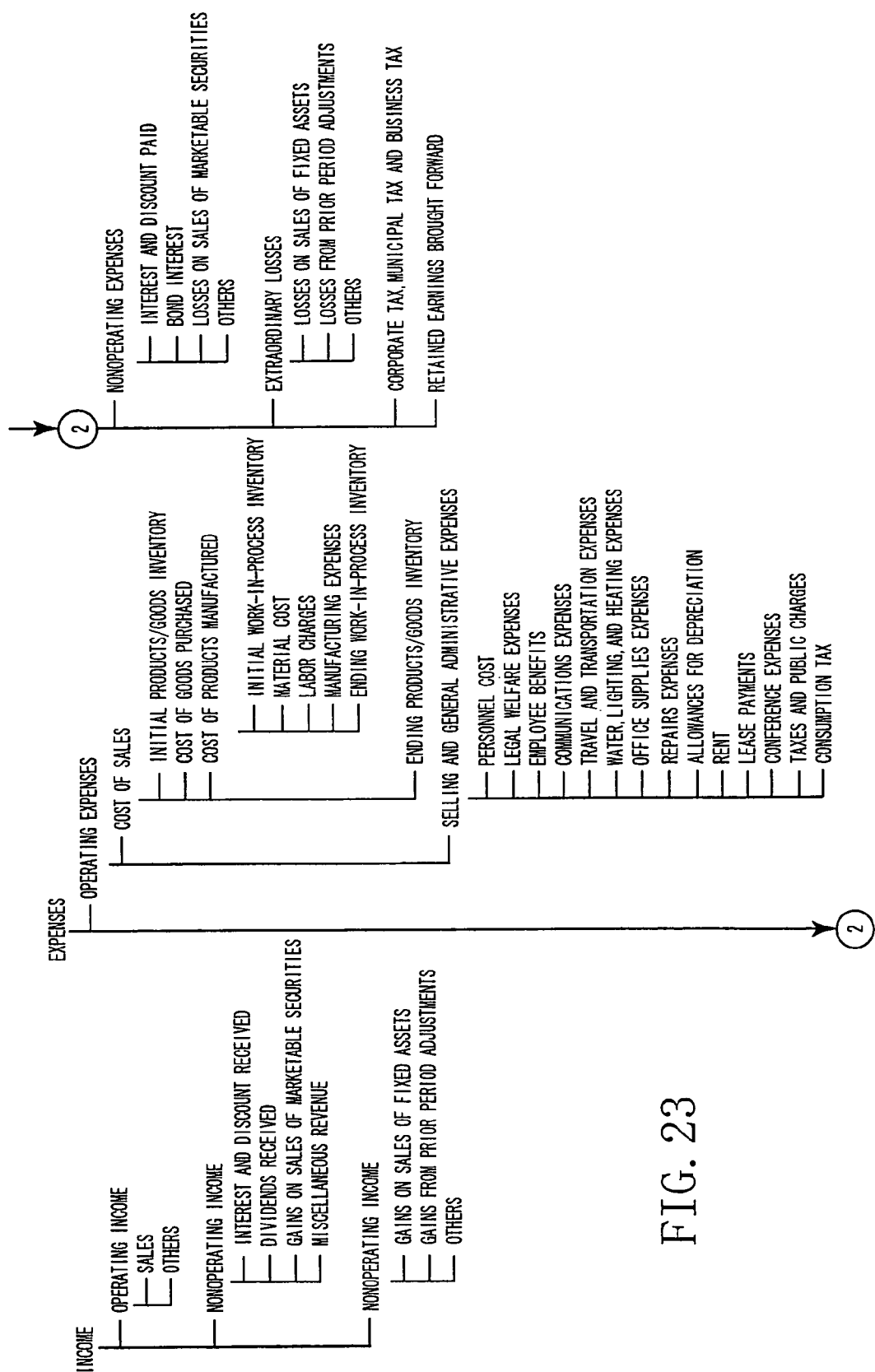
FIG. 23 is a diagram of the hierarchically-structured accounting database for the general ledger continued from FIG. 22.

FIGS. 21 and 22 are respectively a diagram of an exemplary hierarchically-structured accounting database for a general ledger, and a diagram of the hierarchically-structured accounting database for the general ledger continued from FIG. 21, and FIG. 23 is a diagram of the hierarchically-structured accounting database for the general ledger continued from FIG. 22. In FIGS. 21 to 23, the contents of each account item element and the value for each account item element are not shown. As with the hierarchically-structured accounting database for the profit and loss statement shown in FIGS. 2 to 20, the hierarchically-structured accounting database for the general ledger shown in FIGS. 21 to 23 is generated based on account item elements chronologically memorized in the master 20, which are aggregated via the database generation means in accordance with accounting principles.

In the general ledger as shown, assets, liabilities, equity, income, and expenses form the first group. The account item elements assets, liabilities, equity, income, and expenses are each chronologically memorized in the master 20. Account item elements (second group) that belong to concepts at the level immediately below assets are current assets, fixed assets, and deferred assets. The account item elements current assets, fixed assets, and deferred assets are each chronologically memorized in the master 20. Consolidated relationships of assets with respect to current assets, fixed assets, and deferred assets within the concepts at the level therebelow are memorized in the master 21. Account item elements (third group) that belong to concepts at the level immediately below current assets are cash, deposits, bills receivable, accounts receivable, marketable securities, inventory assets, other current assets, and allowances for doubtful accounts. The account item elements cash, deposits, bills receivable, accounts receivable, marketable securities, inventory assets, other current assets, and allowances for doubtful accounts are each chronologically memorized in the master 20. Consolidated relationships of current assets with respect to cash, deposits, bills receivable, accounts receivable, marketable securities, inventory assets, other current assets, and allowances for doubtful accounts within the concepts at the level therebelow are memorized in the master 21. Account item elements (third group) that belong to concepts at the level immediately below fixed assets are tangible fixed assets, intangible fixed assets, and investments and other assets. The account item elements tangible fixed assets, intangible fixed assets, and investments and other assets are each chronologically memorized in the master 20. Consolidated relationships of fixed assets with respect to tangible fixed assets, intangible fixed assets, and investments and other assets within the concepts at the level therebelow are memorized in the master 21. Account item elements (third group) that belong to concepts at the level immediately below deferred assets are new stock issuance cost, bond issuance cost, and bond issuance discount. The account item elements new stock issuance cost, bond issuance cost, and bond issuance discount are each chronologically memorized in the master 20. Consolidated relationships of deferred assets with respect to new stock issuance cost, bond issuance cost, and bond issuance discount within the concepts at the level therebelow are memorized in the master 21.

Account item elements (fourth group) that belong to concepts at the level immediately below deposits are savings deposits, and checking deposits. The account item elements savings deposits, and checking deposits are each chronologically memorized in the master 20. Consolidated relationships of deposits with respect to savings deposits, and checking deposits within the concepts at the level therebelow are memorized in the master 21. Account item elements (fourth group) that belong to concepts at the level immediately below inventory assets are products, goods, work-in-process goods, raw materials, and inventory goods. The account item elements products, goods, work-in-process goods, raw materials, and inventory goods are each chronologically memorized in the master 20. Consolidated relationships of inventory assets with respect to products, goods, work-in-process goods, raw materials, and inventory goods within the concepts at the level therebelow are memorized in the master 21. Account item elements (fourth group) that belong to concepts at the level immediately below other current assets are advance payments/prepaid expenses, deferred tax assets, short-term loans receivable, accounts receivable/accrued income, suspense consumption tax paid, and suspense payments. The account item elements advance payments/prepaid expenses, deferred tax assets, short-term loans receivable, accounts receivable/accrued income, suspense consumption tax paid, and suspense payments are each chronologically memorized in the master 20. Consolidated relationships of other current assets with respect to advance payments/prepaid expenses, deferred tax assets, short-term loans receivable, accounts receivable/accrued income, suspense consumption tax paid, and suspense payments within the concepts at the level therebelow are memorized in the master 21.

Account item elements (fourth group) that belong to concepts at the level immediately below tangible fixed assets are land, buildings, machinery, fixtures/equipment, vehicles/delivery equipment, and accumulated depreciation. The account item elements land, buildings, machinery, fixtures/equipment, vehicles/delivery equipment, and accumulated depreciation are each chronologically memorized in the master 20. Consolidated relationships of tangible fixed assets with respect to land, buildings, machinery, fixtures/equipment, vehicles/delivery equipment, and accumulated depreciation within the concepts at the level therebelow are memorized in the master 21. Account item elements (fourth group) that belong to concepts at the level immediately below intangible fixed assets are business rights, patent rights, leasehold rights, trademark rights, utility model rights, and software. The account item elements business rights, patent rights, leasehold rights, trademark rights, utility model rights, and software are each chronologically memorized in the master 20. Consolidated relationships of intangible fixed assets with respect to business rights, patent rights, leasehold rights, trademark rights, utility model rights, and software within the concepts at the level therebelow are memorized in the master 21.

Account item elements (second group) that belong to concepts at the level immediately below liabilities are current liabilities, and fixed liabilities. The account item elements current liabilities, and fixed liabilities are each chronologically memorized in the master 20. Consolidated relationships of liabilities with respect to current liabilities, and fixed liabilities within the concepts at the level therebelow are memorized in the master 21. Account item elements (third group) that belong to concepts at the level immediately below current liabilities are bills payable, accounts payable, short-term loans payable, accrued amount payable, deposits payable, allowances for bonus payable, and others. The account item elements bills payable, accounts payable, short-term loans payable, accrued amount payable, deposits payable, allowances for bonus payable, and others are each chronologically memorized in the master 20. Consolidated relationships of current liabilities with respect to bills payable, accounts payable, short-term loans payable, accrued amount payable, deposits payable, allowances for bonus payable, and others within the concepts at the level therebelow are memorized in the master 21. Account item elements (third group) that belong to concepts at the level immediately below fixed liabilities are bonds payable, long-term loans payable, deferred tax liabilities, and allowances for employees' retirement benefits. The account item elements bonds payable, long-term loans payable, deferred tax liabilities, and allowances for employees' retirement benefits are each chronologically memorized in the master 20. Consolidated relationships of current liabilities with respect to bonds payable, long-term loans payable, deferred tax liabilities, and allowances for employees' retirement benefits within the concepts at the level therebelow are memorized in the master 21.

Account item elements (second group) that belong to concepts at the level immediately below equity are capital, capital surplus, earned surplus, and treasury stocks. The account item elements capital, capital surplus, earned surplus, and treasury stocks are each chronologically memorized in the master 20. Consolidated relationships of equity with respect to capital, capital surplus, earned surplus, and treasury stocks within the concepts at the level therebelow are memorized in the master 21. Account item elements (third group) that belong to concepts at the level immediately below capital surplus are capital surplus reserve, and other capital surplus. The account item elements capital surplus reserve, and other capital surplus are each chronologically memorized in the master 20. Consolidated relationships of capital surplus with respect to capital surplus reserve, and other capital surplus within the concepts at the level therebelow are memorized in the master 21. Account item elements (third group) that belong to concepts at the level immediately below earned surplus are earned surplus reserve, voluntary retained earnings, and appropriated retained earnings for the period. The account item elements earned surplus reserve, voluntary retained earnings, and appropriated retained earnings for the period are each chronologically memorized in the master 20. Consolidated relationships of earned surplus with respect to earned surplus reserve, voluntary retained earnings, and appropriated retained earnings for the period within the concepts at the level therebelow are memorized in the master 21.

Account item elements (second group) that belong to concepts at the level immediately below income are operating income, nonoperating income, and extraordinary income. The account item elements operating income, nonoperating income, and extraordinary income are each chronologically memorized in the master 20. Consolidated relationships of income with respect to operating income, nonoperating income, and extraordinary income within the concepts at the level therebelow are memorized in the master 21. Account item elements (third group) that belong to concepts at the level immediately below operating income are sales, and others. The account item elements sales, and others are each chronologically memorized in the master 20. Consolidated relationships of operating income with respect to sales, and others within the concepts at the level therebelow are memorized in the master 21. Account item elements (third group) that belong to concepts at the level immediately below nonoperating income are interest and discount received, dividends received, gains on sales of marketable securities, and miscellaneous revenue. The account item elements interest and discount received, dividends received, gains on sales of marketable securities, and miscellaneous revenue are each chronologically memorized in the master 20. Consolidated relationships of nonoperating income with respect to interest and discount received, dividends received, gains on sales of marketable securities, and miscellaneous revenue within the concepts at the level therebelow are memorized in the master 21. Account item elements (third group) that belong to concepts at the level immediately below extraordinary income are gains on sales of fixed assets, gains from prior period adjustments, and others. The account item elements gains on sales of fixed assets, gains from prior period adjustments, and others are each chronologically memorized in the master 20. Consolidated relationships of extraordinary income with respect to gains on sales of fixed assets, gains from prior period adjustments, and others within the concepts at the level therebelow are memorized in the master 21.

Account item elements (second group) that belong to concepts at the level immediately below expenses are operating expenses, nonoperating expenses, extraordinary losses, corporate tax, municipal tax and business tax, and retained earnings brought forward. The account item elements operating expenses, nonoperating expenses, extraordinary losses, corporate tax, municipal tax and business tax, and retained earnings brought forward are each chronologically memorized in the master 20. Consolidated relationships of expenses with respect to operating expenses, nonoperating expenses, extraordinary losses, corporate tax, municipal tax and business tax, and retained earnings brought forward within the concepts at the level therebelow are memorized in the master 21. Account item elements (third group) that belong to concepts at the level immediately below operating expenses are cost of sales, and selling and general administrative expenses. The account item elements cost of sales, and selling and general administrative expenses are each chronologically memorized in the master 20. Consolidated relationships of operating expenses with respect to cost of sales, and selling and general administrative expenses within the concepts at the level therebelow are memorized in the master 21. Account item elements (third group) that belong to concepts at the level immediately below nonoperating expenses are interest and discount paid, bond interest, losses on sales of marketable securities, and others. The account item elements interest and discount paid, bond interest, losses on sales of marketable securities, and others are each chronologically memorized in the master 20. Consolidated relationships of nonoperating expenses with respect to interest and discount paid, bond interest, losses on sales of marketable securities, and others within the concepts at the level therebelow are memorized in the master 21. Account item elements (third group) that belong to concepts at the level immediately below extraordinary losses are losses on sales of fixed assets, losses from prior period adjustments, and others. The account item elements losses on sales of fixed assets, losses from prior period adjustments, and others are each chronologically memorized in the master 20. Consolidated relationships of extraordinary losses with respect to losses on sales of fixed assets, losses from prior period adjustments, and others within the concepts at the level therebelow are memorized in the master 21.

Account item elements (fourth group) that belong to concepts at the level immediately below cost of sales are initial products/goods inventory, cost of goods purchased, cost of products manufactured, and ending products/goods inventory. The account item elements initial products/goods inventory, cost of goods purchased, cost of products manufactured, and ending products/goods inventory are each chronologically memorized in the master 20. Consolidated relationships of cost of sales with respect to initial products/goods inventory, cost of goods purchased, cost of products manufactured, and ending products/goods inventory within the concepts at the level therebelow are memorized in the master 21. Account item elements (fourth group) that belong to concepts at the level immediately below selling and general administrative expenses are personnel cost, legal welfare expenses, employee benefits, communications expenses, travel and transportation expenses, water, lighting, and heating expenses, office supplies expenses, repairs expenses, allowances for depreciation, rent, lease payments, conference expenses, taxes and public charges, and consumption tax. The account item elements personnel cost, legal welfare expenses, employee benefits, communications expenses, travel and transportation expenses, water, lighting, and heating expenses, office supplies expenses, repair expenses, allowances for depreciation, rent, lease payments, conference expenses, taxes and public charges, and consumption tax are each chronologically memorized in the master 20. Consolidated relationships of selling and general administrative expenses with respect to personnel cost, legal welfare expenses, employee benefits, communications expenses, travel and transportation expenses, water, lighting, and heating expenses, office supplies expenses, repair expenses, allowances for depreciation, rent, lease payments, conference expenses, taxes and public charges, and consumption tax within the concepts at the level therebelow are memorized in the master 21. Account item elements (fifth group) that belong to concepts at the level immediately below cost of products manufactured are initial work-in-process inventory, material cost, labor charges, manufacturing expenses, and ending work-in-process inventory. The account item elements initial work-in-process inventory, material cost, labor charges, manufacturing expenses, and ending work-in-process inventory are each chronologically memorized in the master 20. Consolidated relationships of cost of products manufactured with respect to initial work-in-process inventory, material cost, labor charges, manufacturing expenses, and ending work-in-process inventory within the concepts at the level therebelow are memorized in the master 21.

As with the account item elements for constructing the hierarchically-structured accounting database for the profit and loss statement shown in FIGS. 2 to 20, account item elements for constructing the hierarchically-structured accounting database for the general ledger has the start indicator and the end indicator set therefor. Accordingly, the system 10 is capable of generating and outputting, in real time, the hierarchically-structured accounting database for the general ledger as of any given point in the past or at the present. Also, in the system 10, a predetermined index is set for each account item element for constructing the hierarchically-structured accounting database for the general ledger. Accordingly, the system 10 is capable of generating and outputting, in real time, auxiliary journals at any given point in the past or at the present based on the indices. Examples of the auxiliary journals include a cashbook, a sales book, a customers' ledger (an accounts receivable ledger), a creditors' ledger (an accounts payable ledger), a deposits book, a bills register, and a fixed assets list. Screens for the auxiliary journals are separately or collectively displayed on the display.

The cashbook is generated based on the account item element cash under current assets of the general ledger. The cash includes checks and postal money orders. For the account item element cash, indices are set to accord with the cashbook. The screen for the cashbook chronologically displays a detailed status of deposits and withdrawals (not shown) as of any given point in the past or at the present. Examples of the displayed status of deposits and withdrawals include the contents of slips, amounts received, deposit accounts, payment recipients, and amounts paid. The sales book is generated based on the account item element sales under operating income of the general ledger. For the account item element sales, indices are set to accord with the sales book. The screen for the sales book chronologically displays a detailed status of sales (not shown) as of any given point in the past or at the present. Examples of the displayed status of sales include the names of customers, customer addresses/telephone numbers, the names of transacted goods, sale proceeds, amounts credited, and the balance.

The customers' ledger (accounts receivable ledger) is generated based on the account item elements sales and accounts receivable of the general ledger. For the account item elements sales and accounts receivable, indices are set to accord with the customers' ledger. The screen for the customers' ledger chronologically displays a detailed status of accounts receivable (not shown) as of any given point in the past or at the present. Examples of the displayed status of accounts receivable include the names of customers, customer addresses/telephone numbers, the names of transacted goods, methods of deposit, and sale proceeds. The creditors' ledger (accounts payable ledger) is generated based on, for example, the account item elements purchase, subcontracting, and accounts payable of the general ledger. For the account item elements purchase, subcontracting, and accounts payable, indices are set to accord with the creditors' ledger. The screen for the creditors' ledger chronologically displays a detailed status of accounts payable (not shown) as of any given point in the past or at the present. Examples of the displayed status of accounts payable include the names of customers, customer addresses/telephone numbers, the names of transacted goods, methods of payment, purchase price, amounts paid, and the balance. The deposits book is generated based on the account item elements checking deposits, and savings deposits of the general ledger. Although not shown, the deposits book includes the account item elements fixed-term deposits, fixed-term cumulative deposits, and notice deposits, as well as checking deposits and savings deposits. For the account item elements checking deposits and savings deposits, indices are set to accord with the deposits book. The screen for the deposits book chronologically displays a detailed status of deposits (not shown) as of any given point in the past or at the present. Examples of the displayed status of deposits include types of accounts, the names of banks, account numbers, amounts deposited, amounts withdrawn, and the contents of transactions.

The bills register is generated based on the account item elements bills receivable and bills payable of the general ledger. These bills include promissory bills and exchange bills. For the account item elements bills receivable and bills payable, indices are set to accord with the bills register. The screen for the bills register chronologically displays, in detail, bills receivable and bills payable (not shown) as of any given point in the past or at the present. Examples of the displayed bills receivable include the dates of reception of bills, the contents of transactions, values specified on bills, types of bills, bill numbers, drawees of bills, bill payment due dates, domiciles of bills, and records of encashment through bill negotiation or discount. Examples of the displayed bills payable include the dates of payment of bills, the contents of transactions, values specified on bills, types of bills, bill numbers, bill recipients, bill payment due date, and domiciles of bills. The fixed assets list is generated based on the account item elements of the general ledger that form the fixed assets. For the account item elements under fixed assets, indices are set to accord with the fixed assets list. The screen for the fixed assets list chronologically displays, in detail, fixed assets (not shown) as of any given point in the past or at the present. Examples of the displayed fixed assets include the names of fixed assets, legal durable years, the ratios of depreciation by fixed percentage method or fixed amount method, locations for use or storage, quantity, acquisition price, depreciation amount at the end of the year, and an amount obtained by subtracting the depreciation amount at the end of the year from the acquisition price.

The invention claimed is:

1. An account item management system for managing a plurality of account item elements and including a computer resource, and using the computer and money amounts individually corresponding to the account item elements, the account item elements being used as accounting data and arranged from highest to lowest-level concepts, wherein the account item elements are classified into a first account item element group that encompasses the highest level concepts to an n'th account item element group that encompasses the lowest level concepts in order from highest to lowest levels, the system being provided with an item element master that classifies the account item elements for which a start label is set and the amounts into the first to the n'th account item element groups on the basis of first to n'th flags and stores them chronologically from past to present, and a construction master that stores systematic connection relationships of those account item elements;

the system is capable of constructing a plurality of hierarchically-structured accounting database based on the account item elements and their money amounts, are chronologically related to the first to the n'th item element groups using the account item elements and their money amounts stored from past to present, the start label indicating a construction point of time of the hierarchically-structured accounting database of the account item element is set for each account item element, an end label indicating a departure point of time from the hierarchically-structured accounting database of the account item element is set for each account item element departed from the hierarchically-structured accounting database, and chronological management of each hierarchically-structured accounting database and each account item element from past to present using the start label and the end label is performed;

the system has database generation means for generating, in real time, the hierarchically-structured accounting database as of any given point from past to present on the basis of the connection relationship, the start label, and the end label, database output means for outputting the generated hierarchically-structured accounting database in real time, and item element altering means for adding, changing, or deleting the account item element and the money amount at present or in the past; and the item element altering means sets the start label to a newly set account item element and adds the account item element to the hierarchically-structured accounting database, sets the start label to the account item element after the change while setting the end label to the account item element to be changed and changes the account item element in the hierarchically-structured accounting database, and sets the end label to the existing account item element and deletes the account item element from the hierarchically-structured accounting database; and in the system, when the account item element and the money amount are added at present or in the past through the item element altering means, the account item element and the money amount corresponding to the added account item element and the money amount in the account item elements and the money amounts present from the point of addition of the account item element and the money amount to the present are automatically updated, and when the account item element and the money amount belonging to the highest-level concept are changed or deleted at present or in the past through the item element altering means, the other account item elements and the money amounts of the lowest-level concept corresponding to the changed or deleted account item element in the account item elements and the money amounts present from the point of change or the point of deletion of the account item element and the money amount to the present are automatically erased.

2. The account item management system according to claim 1, wherein the database generation means is capable of generating, in real time, the hierarchically-structured accounting database with at least one classification from among the first to n'th account item element groups on the basis of the connection relationship, the start label, and the end label, and the database output means is capable of outputting, in real time, the hierarchically-structured accounting database generated with at least one classification from among the first to n'th account item element groups.

3. The account item management system according to claim 1, wherein, when a given period in the past or up to the present is designated, the database generation means is capable of generating, in real time, a hierarchically-structured accounting database on the basis of the connection relationship, the start label, and the end label using the account item elements present in the designated period, and the database output means is capable of outputting, in real time, the hierarchically-structured accounting database based on the account item elements present in the designated period.

4. The account item management system according to claim 2, wherein, when a given period in the past or up to the present is designated, the database generation means is capable of generating, in real time, a hierarchically-structured accounting database on the basis of the connection relationship, the start label, and the end label using the account item elements present in the designated period, and the database output means is capable of outputting, in real time, the hierarchically-structured accounting database based on the account item elements present in the designated period.

* * * * *